US012377942B1

(12) United States Patent
Snipe et al.

(10) Patent No.: US 12,377,942 B1
(45) Date of Patent: Aug. 5, 2025

(54) SYSTEMS AND METHODS FOR DETECTING WAVES AND CONTROLLING A MARINE VESSEL BASED ON THE DETECTED WAVES

(71) Applicant: Brunswick Corporation, Mettawa, IL (US)

(72) Inventors: Jasmine Snipe, Morrisville, NC (US); Trevor George, Savoy, IL (US); Raissa Carvalho-Ruehle, Charlotte, MI (US); Anna R. Chi, Lisle, IL (US)

(73) Assignee: Brunswick Corporation, Mettawa, IL (US)

( * ) Notice: Subject to any disclaimer, the term of this patent is extended or adjusted under 35 U.S.C. 154(b) by 233 days.

(21) Appl. No.: 18/302,611

(22) Filed: Apr. 18, 2023

Related U.S. Application Data

(60) Provisional application No. 63/418,246, filed on Oct. 21, 2022, provisional application No. 63/332,479, filed on Apr. 19, 2022.

(51) Int. Cl.
*B63H 25/04* (2006.01)
*B63B 79/15* (2020.01)
(Continued)

(52) U.S. Cl.
CPC ............. *B63B 79/15* (2020.01); *B63H 21/21* (2013.01); *B63H 25/04* (2013.01); *G05D 1/0206* (2013.01);
(Continued)

(58) Field of Classification Search
CPC ........ B63B 79/15; B63H 21/21; B63H 25/04; B63H 2021/216; G05D 1/0206; G05D 1/0875
See application file for complete search history.

(56) References Cited

U.S. PATENT DOCUMENTS 6,788,618 B2 * 9/2004 Clayton ................. G01V 1/006
367/13
7,441,189 B2 10/2008 Michaels
(Continued)

FOREIGN PATENT DOCUMENTS

JP 2011213153 9/2013
KR 827396 5/2008
(Continued)

OTHER PUBLICATIONS

Fu et al., The study on extracting of vessels information from the SAR satellite data, 2010, IEEE, p. 266-270 (Year: 2010).*
(Continued)

*Primary Examiner* — McDieunel Marc
(74) *Attorney, Agent, or Firm* — Andrus Intellectual Property Law LLP

(57) ABSTRACT

A method for assisting a user operating a marine vessel, the marine vessel having an image sensor configured to collect imaging data for an area outside the marine vessel. The method includes collecting imaging data via the image sensor for the area outside the marine vessel and analyzing the imaging data to identify a wave within the area outside the marine vessel. The method further includes determining a size of the wave and/or a location of the wave relative to the marine vessel and determining whether the size and/or the location of the wave is beyond one or more thresholds. The method further includes automatically modifying an operation of the marine vessel when the size and/or location of the wave is beyond the one or more thresholds to thereby assist the user in managing an effect of the wave on the marine vessel.

20 Claims, 19 Drawing Sheets

(51) Int. Cl.
*B63H 21/21* (2006.01)
*G05D 1/00* (2006.01)

(52) U.S. Cl.
CPC ..... *G05D 1/0875* (2013.01); *B63H 2021/216* (2013.01)

(56) References Cited

U.S. PATENT DOCUMENTS

| | | |
|---|---|---|
| 7,924,164 B1 | 4/2011 | Staerzl |
| 8,417,399 B2 | 4/2013 | Arbuckle et al. |
| 9,267,340 B2 * | 2/2016 | Ankargren ............... B66C 13/02 |
| 10,198,005 B2 | 2/2019 | Arbuckle et al. |
| 10,259,555 B2 | 4/2019 | Ward et al. |
| 10,322,787 B2 | 6/2019 | Ward |
| 10,372,976 B2 | 8/2019 | Kollmann et al. |
| 10,429,845 B2 | 10/2019 | Arbuckle et al. |
| 10,633,072 B1 | 4/2020 | Arbuckle et al. |
| 10,640,190 B1 | 5/2020 | Gonring |
| 10,671,073 B2 | 6/2020 | Arbuckle et al. |
| 10,795,366 B1 | 10/2020 | Arbuckle et al. |
| 10,845,811 B1 | 11/2020 | Arbuckle et al. |
| 11,247,753 B2 | 2/2022 | Arbuckle et al. |
| 11,327,494 B1 | 5/2022 | Arbuckle et al. |
| 11,964,742 B2 * | 4/2024 | Kadota ................... B63B 79/40 |
| 11,987,340 B2 * | 5/2024 | Kadota ................ G05D 1/2435 |
| 2010/0002536 A1 * | 1/2010 | Brewer ................ G01V 1/3817 367/16 |
| 2020/0160726 A1 | 5/2020 | Malouf et al. |
| 2020/0202719 A1 | 6/2020 | Derginer et al. |

FOREIGN PATENT DOCUMENTS

| | | |
|---|---|---|
| KR | 202204988 | 4/2022 |
| RU | 171461 | 6/2017 |

OTHER PUBLICATIONS

Amabdiyil et al., Marine vessel detection comparing GPRS and satellite images for security applications, 2016, IEEE, p. 443-453 (Year: 2016).*

Hamad et al., A Survey of Positioning Systems for Ships Based on New Categories, 2020, IEEE, p. 189-194 (Year: 2020).*

Marques et al., Size-invariant Detection of Marine Vessels From Visual Time Series, 2021, IEEE, p. 443-453 (Year: 2021).*

* cited by examiner

| SEVERITY AND ORIGIN | ACTIONS |
|---|---|
| FRONT MEDIUM | – LIGHT ALL LEDs ON TOP OF HELM |
| FRONT SEVERE | – LIGHT ALL LEDs ON TOP OF HELM<br>– LIGHT LEDs TO ALL STORAGE LOCATIONS AND LIFE VESTS |
| LEFT MEDIUM | – LIGHT LEDs ON LEFT HALF OF TOP OF HELM |
| LEFT SEVERE | – LIGHT LEDs ON LEFT HALF ON TOP OF HELM<br>– LIGHT LEDs TO ALL STORAGE LOCATIONS AND LIFE VESTS<br>– SOUND ALARM FROM LEFT SIDE OF BOAT<br>– BLINK STEERING WHEEL LEDs IN COUNTERCLOCKWISE ORDER |
| RIGHT MEDIUM | – LIGHT LEDs ON RIGHT HALF OF TOP OF HELM |
| RIGHT SEVERE | – LIGHT LEDs ON RIGHT HALF OF TOP OF HELM<br>– LIGHT LEDs TO ALL STORAGE LOCATIONS AND LIFE VESTS<br>– SOUND ALARM FROM RIGHT SIDE OF BOAT<br>– BLINK STEERING WHEEL LEDs IN CLOCKWISE ORDER |

FIG. 13

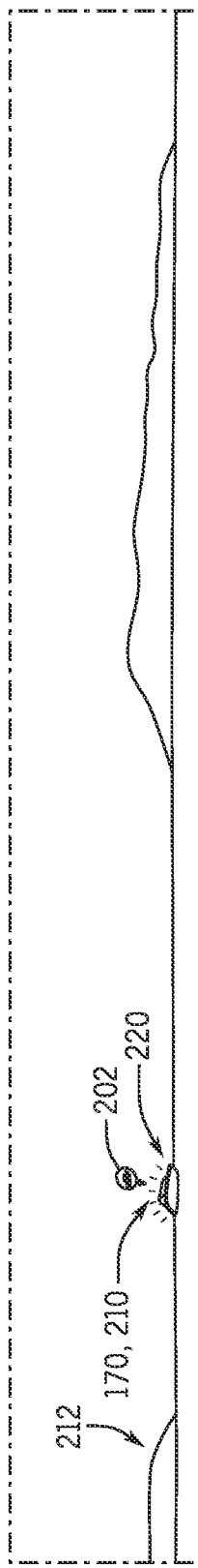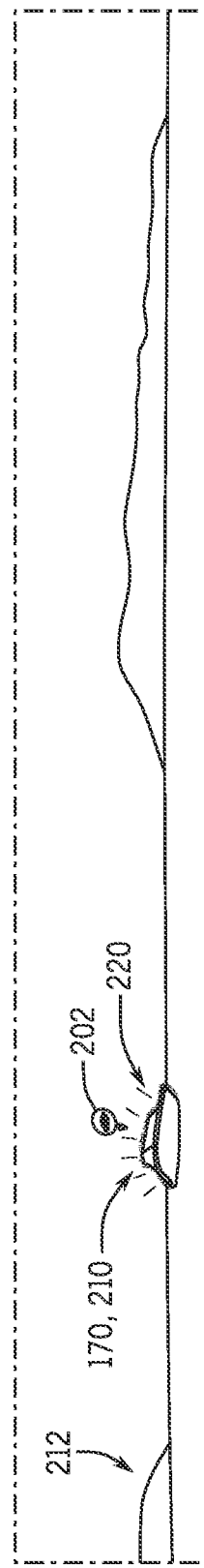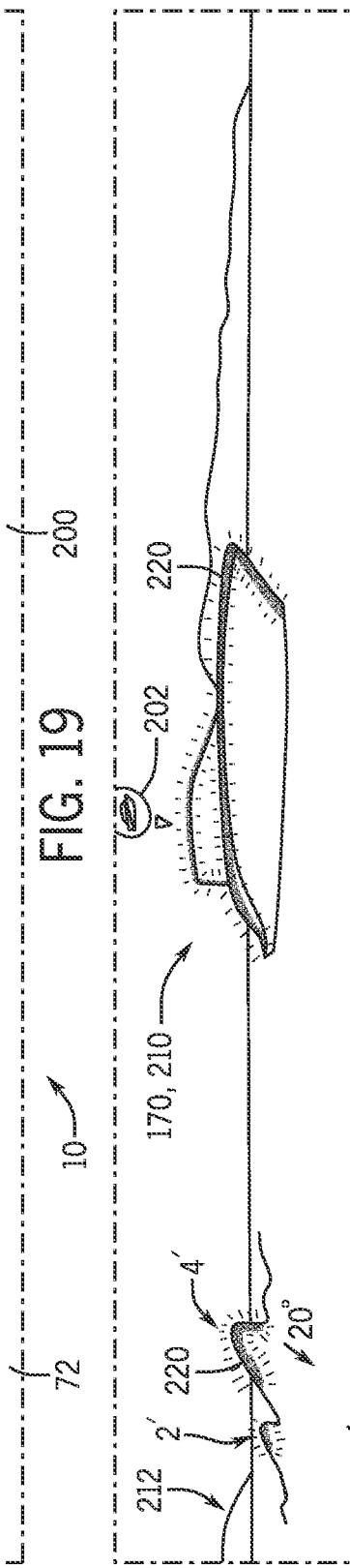

SYSTEMS AND METHODS FOR DETECTING WAVES AND CONTROLLING A MARINE VESSEL BASED ON THE DETECTED WAVES

CROSS REFERENCE TO RELATED APPLICATIONS

This application claims the benefit of U.S. Provisional Patent Application No. 63/332,479, filed Apr. 19, 2022, and U.S. Provisional Patent Application No. 63/418,246, filed Oct. 21, 2022, which are each incorporated herein by reference in its entirety.

FIELD

The present disclosure generally relates to systems and methods for detecting waves and controlling a marine vessel based on the detected waves.

BACKGROUND

The following are incorporated herein by reference in entirety.

U.S. Pat. No. 7,441,189 discloses a method of producing an instrumentation interface for a vehicle having a display device, which may include initializing a display format for the instrumentation interface in accordance with one or more characteristics of the vehicle. The method may further include collecting customization data to configure a display site defined by the display format of the instrumentation interface and generating the instrumentation interface via the display device in accordance with the display format and the customization data for the display site.

U.S. Pat. No. 7,924,164 discloses a detection system that senses the location of a preselected color within one or more monitored zones of a machine tool. If the operator of a machine tool wears a red glove, the system detects the location of the color red and defines various monitored zones through the use of synchronization signals and a time circuit. The system can take action based on the location of the particular monitored zones in which the red glove is sensed. These actions can include the sounding of a horn, the lighting of a light, or the deactivation of the machine tool.

U.S. Pat. No. 8,417,399 discloses systems and methods for orienting a marine vessel to minimize at least one of pitch and roll in a station keeping mode. A plurality of marine propulsion devices are controlled to maintain orientation of a marine vessel in a selected global position and heading. A control device receives at least one of actual pitch and actual roll of the marine vessel in the global position. The control device controls operation of the marine propulsion units to change the heading of the marine vessel to minimize at least one of the actual pitch and the actual roll while maintaining the marine vessel in the selected global position.

U.S. Pat. No. 10,259,555 discloses a method for controlling movement of a marine vessel near an object, which includes accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,372,976 discloses an object detection system for a marine vessel having at least one marine drive including at least one image sensor positioned on the marine vessel and configured to capture an image of a marine environment on or around the marine vessel, and a processor. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

U.S. Pat. No. 10,429,845 discloses a method for controlling a position of a marine vessel near a target location includes measuring a present location of the marine vessel, and based on the vessel's present location, determining if the marine vessel is within a predetermined range of the target location. The disclosure further describes examples of proximity and vision-based sensors provided at the bow, stern, port and/or starboard sides of the marine vessel, including radars, sonars, LiDAR devices, cameras, lasers, Doppler direction finders, or other devices individually capable of determining both the relative location and distance to an object O near the marine vessel 1, such as a dock, seawall, slip, buoy, shoreline, large rock or tree, etc. In some embodiments, the proximity sensors are RFID receivers and RFID tags can be placed on the object O at strategic positions. In other embodiments, the RFID receivers may instead be radio frequency identification and geometry (RFIG) units, which determine location, poise, motion, and orientation information using photovoltaic components and IR-LEDs on the receiver's integrated circuit. The vision-based sensors can be cameras. A control module can be programmed with a computer vision algorithm that allows it to interpret photographs or video from the cameras.

U.S. Pat. No. 11,247,753 discloses a method for maintaining a marine vessel at a global position and/or heading. The method includes receiving measurements related to vessel attitude and estimating water roughness conditions based on the measurements. A difference between the vessel's actual global position and the target global position and/or a difference between the vessel's actual heading and the target heading are determined. The method includes calculating a desired linear velocity based on the position difference and/or a desired rotational velocity based on the heading difference. The vessel's actual linear velocity and/or actual rotational velocity are filtered based on the roughness conditions. The method includes determining a difference between the desired linear velocity and the filtered actual linear velocity and/or a difference between the desired rotational velocity and the filtered actual rotational velocity. The method also includes calculating vessel movements that will minimize the linear velocity difference and/or rotational velocity difference and carrying out the calculated movements.

U.S. Patent Application Publication No. 2020/0160726 discloses a proximity sensor system on a marine vessel that includes one or more proximity sensors, each at a sensor location on the marine vessel and configured to measure proximity of objects and generate proximity measurements. A processor is configured to store a two-dimensional vessel outline of the marine vessel with respect to a point of navigation for the marine vessel, receive the proximity measurements measured by one or more proximity sensors on the marine vessel, and identify four linearly-closest proximity measurements to the two-dimensional vessel outline, including one closest proximity measurement in each of a positive X direction, a negative X direction, a positive Y direction, and a negative Y direction. The processor then generates a most important object (MIO) dataset identifying the four linearly-closest proximity measurements.

U.S. Patent Application Publication No. 2020/0202719 discloses a method of controlling propulsion of a marine vessel that includes receiving proximity measurements from one or more proximity sensors on the marine vessel and limiting user input authority over propulsion output in a direction of an object by at least one propulsion device based on the proximity measurement so as to maintain the marine vessel at least a buffer distance from the object. The method further includes suspending maintenance of the buffer distance from the object in response to a user-generated instruction. Then, when user control input is received via a user input device to move the marine vessel in the direction of the object, the at least one propulsion device is controlled based on the user control input such that the marine vessel approaches and impacts the object.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure generally relates to a system configured to assist a user in identifying an object in an area outside a marine vessel. An image sensor is configured to collect imaging data for the area outside the marine vessel. A display device is configured to generate a display on a windshield assembly. The windshield assembly comprises a windshield and a frame adjacent to at least one side of the windshield. A control system is configured to analyze the imaging data to identify an object within the area outside the marine vessel and to control the display device to generate a display to visually indicate the object on the windshield assembly, where the display assists the user positioned at a helm of the marine vessel in identifying the object through the windshield.

In another optional aspect, the control system is configured to control the display device such that the display is positioned to visually align with the object when the object is viewed through the windshield by the user positioned at the helm. In another optional aspect, the display device is positioned adjacent to the windshield such that the display is positioned to visually align with the object at least one of vertically and horizontally when the object is viewed through the windshield by the user positioned at the helm.

In another optional aspect, the display on the display device is viewable on the windshield and positioned to visually align with the object when the object is viewed through the windshield by the user positioned at the helm. In another optional aspect, the display device is configured to project the display onto the windshield. In another optional aspect, the control system is further configured to identify an edge of the object and to control the display device to generate the display to visually indicate at least part of the edge of the object when viewed through the windshield.

In another optional aspect, the control system is further configured to identify an attribute of the object, and wherein the display device is further configured to generate the display to visually indicate the attribute of the object. In another optional aspect, the attribute of the object comprises at least one of a type of the object, an identity of the object, a distance from the marine vessel to the object, a direction in which the object is traveling relative to the marine vessel, and a velocity at which the object is moving. In another optional aspect, the control system is further configured to compare the attribute to a threshold and to control the display device to vary a color of the display based on the comparison of the attribute and the threshold.

In another optional aspect, the display device comprises an array of light emitting diodes having an elongated housing, and wherein the elongated housing is supported by the frame of the windshield assembly.

In another optional aspect, the image sensor comprises two or more individual image sensors positioned to have overlapping fields of view for collecting the imaging data for the area outside the marine vessel.

Another aspect according to the present disclosure generally relates to a method for assisting a user in identifying an object in an area outside a marine vessel, where the marine vessel includes an image sensor configured to collect imaging data for the area outside the marine vessel, and a windshield assembly having a windshield and a frame adjacent to at least one side of the windshield. The method includes providing a display device configured to generate a display on the windshield assembly and analyzing the imaging data to identify an object within the area outside the marine vessel. The method further includes controlling the display device such that the display is positioned to visually align with the object when the object is viewed through the windshield by the user positioned at a helm of the marine vessel to thereby assist the user in identifying the object.

In another optional aspect, the display is generated on the windshield.

In another optional aspect, the method further includes identifying an edge of the object and generating the display to indicate at least part of the edge of the object when the object is viewed through the windshield by the user positioned at the helm.

In another optional aspect, the method further includes determining an identity of the object and controlling the display device to display the identity of the object.

In another optional aspect, the method further includes determining an attribute of the object and displaying the attribute on the windshield assembly. In another optional aspect, the attribute comprises as least one of a type of the object, a direction in which the object is traveling, a size of the object, and a velocity of the object.

In another optional aspect, the method further includes controlling the display device to change a color of the display based on the attribute of the object. In another optional aspect, the method further includes comparing the attribute to a threshold and changing the color of the display based on whether the attribute exceeds the threshold.

In another optional aspect, the marine vessel further includes a steering device for steering the marine vessel, where the display device is a first display device and the steering device comprises a second display device, and where the method further includes identifying a position of the object relative to the marine vessel and controlling the second display device to display a recommended steering direction for steering the steering device based on the position of the object.

Another aspect according to the present disclosure generally relates to a method for assisting a user operating a marine vessel, where the marine vessel has an image sensor configured to collect imaging data for an area outside the marine vessel. The method includes collecting imaging data via the image sensor for the area outside the marine vessel and analyzing the imaging data to identify a wave within the area outside the marine vessel. The method further includes determining a size of the wave and/or a location of the wave relative to the marine vessel and determining whether the size and/or the location of the wave is beyond one or more thresholds. The method further includes automatically modifying an operation of the marine vessel when the size and/or location of the wave is beyond the one or more thresholds to thereby assist the user in managing an effect of the wave on the marine vessel.

In another optional aspect, the method further includes waiting a predetermined time after determining that the size and/or location of the wave is beyond the one or more thresholds before automatically modifying the operation of the marine vessel. In another optional aspect, the method further includes displaying a countdown of the predetermined time before automatically modifying the operation of the marine vessel.

In another optional aspect, the method further includes monitoring the size and/or the location over time and discontinuing automatically modifying the operation of the marine vessel when the size and/or the location is no longer beyond the one or more thresholds.

In another optional aspect, automatically modifying the operation of the marine vessel includes changing the operation from a first setting to a second setting, and the method further includes monitoring the size and/or the location and returning the operation of the marine vessel to the first setting when the size and/or the location is no longer beyond the one or more thresholds. In another optional aspect, the first setting and the second setting correspond to at least one of a steering angle, a trim angle, and a powerhead speed for the marine vessel.

In another optional aspect, automatically modifying the operation of the marine vessel includes changing a speed of the marine vessel and/or a heading of the marine vessel.

In another optional aspect, a pitch and/or a roll of the marine vessel is adjustable by controlling a trim actuator, and automatically modifying the operation of the marine vessel includes controlling the trim actuator to change the pitch and/or the roll of the marine vessel.

In another optional aspect, the image sensor includes a stereo vision system having at least two individual image sensors with overlapping fields of view for collecting the imaging data for the area outside the marine vessel, and where the size of the wave is determined by analyzing the imaging data from each of the at least two individual image sensors.

In another optional aspect, the imaging data is collected via the image sensor for the area outside the marine vessel at two or more instances, the imaging data is analyzed to identify the wave within the area outside the marine vessel at each of the two or more instances, and the method further includes determining a direction in which the wave moved between the two or more instances and automatically modifying the operation of the marine vessel based also on the direction in which the wave moved between the two or more instances.

In another optional aspect, the method further includes determining a distance between the wave and the marine vessel and automatically modifying the operation of the marine vessel based also on the distance between the wave and the marine vessel.

In another optional aspect, the method further includes measuring a velocity of the marine vessel and automatically modifying the operation of the marine vessel based also on the velocity of the marine vessel.

In another optional aspect, the one or more thresholds comprises a plurality of thresholds, and the method further includes varying the automatic modification of the operation of the marine vessel based on which of the plurality of threshold the size and/or the location of the wave is beyond.

In another optional aspect, the one or more thresholds are based at least in part on at least one of a hull type and a hull dimension.

Another aspect according to the present disclosure generally relates to a method for assisting a user operating a marine vessel, where the marine vessel has an image sensor configured to collect imaging data for an area outside the marine vessel. The method includes collecting imaging data via the image sensor for the area outside the marine vessel at two or more instances and analyzing the imaging data to identify a wave within the area outside the marine vessel at each of the two or more instances. The method further includes determining a size of the wave in at least one of the two or more instances and determining a location of the wave relative to the marine vessel at each of the two or more instances. The method further includes comparing the location of the wave in the two or more instances to determine a direction in which the wave moved relative to the marine vessel over time and determining whether the size and the direction of the wave considered together are beyond a threshold. The method further includes requesting approval from the user to automatically modifying an operation of the marine vessel when the size and the direction of the wave are beyond the threshold and automatically modifying the operation of the marine vessel when the size and the direction of the wave considered together are beyond the threshold and approval is received from the user to automatically modifying the operation of the marine vessel to thereby assist the user in managing an effect of the wave on the marine vessel.

In another optional aspect, the method further includes comparing the location of the wave at each of the two or more instances to determine a velocity of the wave, where automatically modifying the operation of the marine vessel is based also on the velocity of the marine vessel.

In another optional aspect, the method further includes determining the direction of the wave as an angle relative to the marine vessel, where the threshold corresponds to the size of the wave being at least 4 feet tall and the direction of the wave relative to the marine vessel being at least 45 degrees.

In another optional aspect, the marine vessel is steerable by controlling a steering actuator, and automatically modifying the operation of the marine vessel includes controlling the steering actuator to steer the marine vessel so that the direction of the wave relative to the marine vessel is less than 45 degrees.

Another aspect according to the present disclosure generally relates to a system configured to assist a user in operating a marine vessel. The system includes a marine drive operable to propel the marine vessel in water and a steering actuator operable to steer the marine vessel. An image sensor is configured to collect imaging data for an area outside the marine vessel. A control system is configured to analyze the imaging data to identify a wave within the area outside the marine vessel, determine a size of the wave and/or a location of the wave relative to the marine vessel, determine whether the size and/or the location of the wave is beyond a threshold, and automatically modify operation of at least one of the marine drive and the steering actuator when the size and/or the location of the wave is beyond the threshold to thereby assist the user in managing an effect of the wave on the marine vessel.

In another optional aspect, the image sensor is configured to collect the imaging data at two or more instances, where the control system is further configured to determine the location of the wave at each of the two or more instances and to compare the location of the wave at each the two or more instances to determine a direction in which the wave moved relative to the marine vessel over time, and where the control system is further configured to automatically modify the operation of the marine vessel based also on the direction in which the wave moved between the two or more instances.

It should be recognized that the different aspects described throughout this disclosure may be combined in different manners, including those than expressly disclosed in the provided examples, while still constituting an invention accord to the present disclosure.

Various other features, objects and advantages of the disclosure will be made apparent from the following description taken together with the drawings.

BRIEF DESCRIPTION OF THE DRAWINGS

The present disclosure is described with reference to the following Figures.

FIG. 13 shows exemplary controls of the display devices based on the severity and origin of detected objects according to the present disclosure;

FIGS. 18-20 are graphic representations of information displayed on a heads-up-display according to the present disclosure, here showing a second marine vessel driving in front of the present marine vessel;

DETAILED DISCLOSURE

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible.

Figure 1:
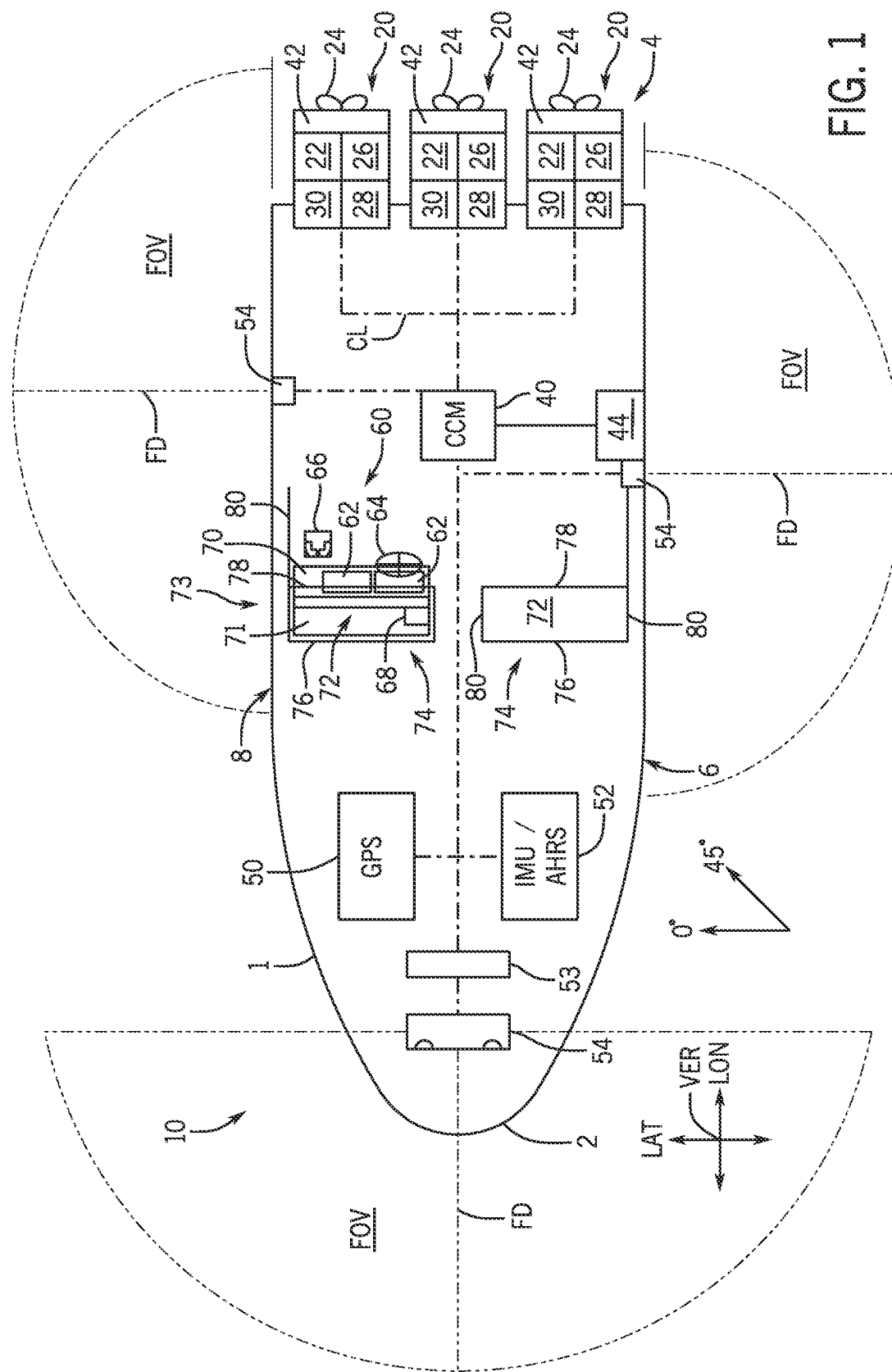
FIG. 1 is a top view of a marine vessel incorporating one embodiment of system for displaying information according to the present disclosure.

FIG. 1 shows a system 10 for displaying data for a marine vessel 1 according to the present disclosure. The marine vessel 1 extends between a bow 2 and a stern 4 along a longitudinal axis LON, and between a port side 6 and starboard side 8 along a latitudinal axis LAT perpendicular to the longitudinal direction LON (each also being perpendicular to the vertical axis VER). The marine vessel 1 is propelled through the water by a plurality of marine propulsion devices 20, which may also be referred to as marine drives. The marine propulsion devices 20 are presently shown as outboard motors but could instead be inboard motors, stern drives, pod drives, and/or jet drives. Each marine propulsion device 20 includes a powerhead 22. The powerheads 22 may be internal combustion engines (e.g., gasoline or diesel engines), electric motors, and/or hybrids thereof. Each marine propulsion device 20 in FIG. 1 also includes a propeller 24 coupled in torque-transmitting relationship with a respective powerhead 22 to generate propulsion in the water.

The marine propulsion devices 20 further include powerhead speed sensors 26 measuring a speed of a respective powerhead 22 (or an output shaft thereof). In one example, the powerhead speed sensors 26 may be shaft rotational speed sensors (e.g., Hall-Effect sensors), which measure a speed of the powerhead 22 in rotations per minute (RPM) in a manner known in the art. Each marine propulsion device 20 is further provided with a steering actuator 28 configured to steer the marine propulsion device 20, respectively, in accordance with commands from a steering device as discussed further below. The steering actuators 28 may operate as a "steer by wire" system rather than including physical linkages between the marine propulsion devices 20 and steering input devices (e.g., a steering wheel). The steering actuators 28 include steering angle sensors therein, which provide feedback regarding the steering angle of the corresponding marine propulsion device 20 in a manner known in the art. The steering actuators 28 may be hydraulically, pneumatically, and/or electromechanically operated. Additional information regarding exemplary steering actuators is provided in U.S. Pat. Nos. 7,150,664; 7,255,616; and 7,467,595, which are incorporated by reference herein.

Similarly, each marine propulsion device 20 is provided with a trim actuator 30 configured to adjust the trim angle of that marine propulsion device 20 in a manner known in the art. The trim actuators 30 include steering angle sensors therein, which provide feedback regarding the trim angle of the corresponding marine propulsion device 20 in a manner known in the art. The trim actuators 30 may be hydraulically, pneumatically, and/or electromechanically operated. Additional information regarding exemplary trim actuators is provided in U.S. Pat. Nos. 6,583,728; 7,156,709; 7,416,456; and 9,359,057, which are incorporated by reference herein.

With continued reference to FIG. 1, a central control module 40 (or CCM) is provided in signal communication with the powerheads 22, as well as being in signal communication with the associated sensors and other components noted herein below. In certain examples, the central control module 40 communicates with propulsion control modules 42 (or PCMs) and/or other control devices associated with each of the marine propulsion devices 20 in a manner known in the art. Although FIG. 1 shows one central control module 40, it should be recognized that more than one central control module may work together serially and/or in parallel, such as one central control module for each of the marine propulsion devices 20.

Power is provided to the marine vessel 1 via a power system 44, which may include batteries and/or other energy storage systems known in the art. The power system 44 provides power to the central control module 40 and propulsion control modules 42, as well as to other components associated with the marine propulsion devices 20 or marine vessel 1 more generally, as discussed further below. One such additional component powered by the power system 44 is a global positioning system (GPS) 50 that provides location and speed of the marine vessel 1 to the central control module 40. Additionally, or alternatively, a vessel speed sensor such as a Pitot tube or a paddle wheel could be provided to detect the speed of the marine vessel 1. The marine vessel 1 may also include an inertial measurement unit (IMU) or an attitude and heading reference system (AHRS, collectively shown as the IMU/AHRS 52). An IMU has a solid state, rate gyro electronic compass that indicates the vessel heading and solid-state accelerometers and angular rate sensors that sense the vessel's attitude and rate of turn. An AHRS provides 3D orientation of the marine vessel 1 by integrating gyroscopic measurements, accelerometer data, and magnetometer data. The IMU/AHRS 52 could be GPS-enabled, in which case a separate GPS 50 would not be required.

As discussed in U.S. Pat. Nos. 8,417,399 and 11,247,753, the IMU/AHRS 52 can be used to detect waves impacting the vessel. In particular, the IMU/AHRS 52 measures the pitch and roll caused by these waves, which may arrive at different angles to the bow, stern, port side, or starboard side. Unless otherwise stated, angles within the present disclosure will be referenced relative to the sides (i.e., port side 6 and starboard side 8) of the marine vessel 1, whereby a 0-degree angle corresponds to a wave impacting perpendicular to the side (i.e., along the latitudinal axis LAT) and a 45-degree angle corresponds to halfway between parallel (i.e., along the longitudinal axis LON) and perpendicular to the side. The frequency and amplitude of the pitch and roll measurements vary based on the size of the waves and the direction in which the waves are traveling relative to the vessel. Therefore, the pitch and roll can be used to determine the size and direction of the waves relative to the vessel. The heading of the vessel can then be controlled change the angle at which the waves impact the vessel to minimize the pitch and/or roll caused by these waves.

With continued reference to FIG. 1, the system 10 includes an object detection system having one or more image sensors 54 and an image processor 53. The image sensors 54 capture images, or data more generally, relating to objects and/or the environment on or around the marine vessel 1 (including waves, as discussed further below). The image sensors may also be referred to as being configured to collect or acquire imaging data for an area outside the marine vessel 1. The area outside the marine vessel 1 may be that which is on or above the surface of the water, and/or below the surface depending on the types of image sensors and other sensors provided. The present inventors have recognized that the presently disclosed systems and methods are particularly well suited for identifying objects within the area outside the marine vessel. In particular, the object detection systems can be utilized to map the surface of the water around the marine vessel. This in turn allows for objects extending upwardly for the surface of the water to readily stand out, as well as providing a platform for applying image analysis techniques known in the art to identify features and the nature of the objects themselves (e.g., sizes, identities, etc.).

The images sensors 54 may vary in type, field of view, focal distance, or mounting location on the marine vessel 1. Examples of image sensors 54 include proximity and/or vision-based sensors such as radars, sonars, LiDAR devices, cameras and/or stereo-vision cameras, lasers, and/or Doppler direction finders. It should be recognized that stereo-vision is not limited to any particular type of image sensors or packaging thereof. By way of example, one device may include two or more image sensors 54 specifically configured to provide stereo-vision in a single housing or package. Alternatively, stereo-vision can be provided via processing imaging data collected from the images sensors 54 of two or more devices that are spaced apart from each other (each device having at least one image sensors 54, including having multiple image sensors 54 to themselves be configured to provide stereo-vision).

One example of a commercially available image sensor is the S27 Camera produced by Carnegie Robotics. Other commercially available image sensors are produced by Avikus, Sea Machines, and Buffalo Automation. Separate image sensors 54 may be provided for acquiring imaging data to identify objects that are ahead of the marine vessel versus to the sides and/or aft thereof. The different regions outside the marine vessel imaged by each of the image sensors 54 may be referred to collectively as a single area outside the marine vessel. In certain embodiments, separate individual image sensors 54 are positioned to individually acquire imaging data from regions that overlap with each other, for example with a first sensor being used to capture images for object identification (e.g., a camera), and a second sensor being used for determining an accurate distance to that object (e.g., LiDAR or stereovision).

Similarly, image sensors 54 may be positioned on the marine vessel 1 to have overlapping fields of view. In this overlapping configuration, imaging data from multiple image sensors 54 may be processed together to provide redundancy, provide views of a same object from different angles, for calibrating devices, image stitching, and/or to improve the accuracy of calculating distances. In certain configurations, the distance from the marine vessel 1 to the object is determined by through triangulation techniques known in the art by processing imaging data from two or more cameras. Overlapping fields of views may also be used to ensure that all areas of interest outside the marine vessel 1 are covered, and/or to accommodate for any visual barriers inside and/or outside the marine vessel. For simplicity, systems 10 having multiple image sensors 54 that acquire imaging data from different individual areas outside the marine vessel may also be referred to as having a single image sensor 54 that acquires imaging data for an area outside the marine vessel.

In the system 10 of FIG. 1, one image sensor 54 is provided at the bow 2 and two image sensors 54 are provided closer to the stern 4. The image sensor 54 at the bow 2 may be configured to cover a 180-degree field of view FOV with a focal distance FD between 0 and 2,500 feet, for example. Different sensors may be used to cover the different distances, such as radar for long distances (e.g., 1 mile or greater), sonar or cameras for near distances (e.g., 250 m), and LiDAR for intermediate distances, for example. Likewise, different configurations of like sensors may be used, such as a camera with a wide FOV for near field vision and a camera with a standard field of view FOV for longer distances (i.e., wide FOV cameras tending to have poor resolution at greater distances). It should be recognized that the focal distances FD and fields of view FOV may vary from that shown. Similarly, the focal distances FD and the fields of view FOV shown may reflect a combined region for acquiring imaging data for an image sensor 54 having multiple individual imaging sensors therein (e.g., a stereo-vision camera).

In certain examples, the image sensors 54 at the bow 2 has a field of view FOV and focal distance FD to overlap with the image sensors 54 positioned closer to the stern 4. The two image sensors 54 closer to the stern 4 may be formed along with the helm 60, built into the sides of the marine vessel 1 (e.g., aft of the helm 60), or be supported by the transom at the stern 4, for example. In the placement of FIG. 1, the fields of view for the images sensors 54 capture the side and aft areas outside the marine vessel 1, which among other purposes can be used to track other objects coming up behind or to the side of the marine vessel 1. In certain examples, the two image sensors 54 closer to the stern 4 have fields of view FOV between 120 and 270 degrees and focal distances between 0 and 500 feet. In certain examples, the accuracy of identifying the object and/or its position along all three axes may be improved by mounting the image sensors 54 at different heights on the marine vessel 1.

The imaging data from the image sensors 54 is provided as an input to one or more image processors 53 that process the imaging data to generate an image, make comparisons with previously generated images, identify patterns in the imaging data or images, and/or detect objects within the imaging data or images. Comparing a sequence of imaging data acquired at two or more instances in time also allows the system 10 to determine a direction in which an object identified within this imaging data is moving relative to the marine vessel 1 over time. For example, the change in pixel location for a feature of a given object (e.g., a particular edge of the object, a light at the bow of a marine vessel, a pillar supporting a windshield of a marine vessel), along with knowing the distance to that feature at each instance, can be used to determine the direction in which the object is traveling relative to the images sensors, and thus relative to the marine vessel using stereo-vision processing techniques. Changes in the movement of the object can further be analyzed to determine the velocity, acceleration (i.e., rates at which the object is moving in the two or more instances of imaging data), and/or a path of travel for the object over time. Furthermore, this information can be used to estimate an angle at which the wave is expected to impact the marine vessel. In certain examples this information can be used to determine a heading of the object, such as a cardinal direction. However, it should be recognized that other information may override the direction of travel for determining the heading of the object. For example, a marine vessel (i.e., as the object) need not travel only forwardly, and thus its bow may be used to determine the heading rather than the direction of travel. It should be recognized that the present disclosure may refer to objects moving relative to the marine vessel even where the object is stationary and the marine vessel is what is moving.

In certain examples, the image processors 53, or the control system 100 more generally (FIG. 2, discussed further below), incorporates edge detection technology, computer vision machine learning (CVML), and/or an artificial neural network trained to detect patterns or predefined objects. A library of images pre-classified as corresponding to particular objects (e.g., marine vessels, docks, rock formations, buoys, calm water, and waves) may be used for training for the image processor 53, and/or as a reference for comparing to the imaging data from the image sensors 54. The library may also include these objects in different orientations or headings, such as another vessel headed away from, perpendicular to, or towards the marine vessel 1 (including various angles of travel therebetween), or different states such as running, planing, trolling, or sitting stationary.

The same object will appear much larger within an image from 10 feet away than from 50 feet away. Therefore, the size of the object within the imaging data (e.g., the number of pixels comprising the object versus a background) may need to be scaled to determine the true size of the object. The present inventors have recognized that the imaging data from one or more image sensors 54 can also be used to determine the true sizes of objects within the imaging data or images, such as through stereo-vision techniques. These stereo-vision techniques can be performed using 2-dimensional imaging data or images without the need for a sensor directly sensing the distances to the objects (e.g., time-of-flight sensors).

In particular, stereo-vision uses images from image sensors 54 that are separated from each other by a distance. The images sensors 54 are used to capture imaging data of the same object, but from different perspectives. The imaging data from the two or more image sensors 54 are analyzed to identify features of that same object within the images, such as the crest of a wave as the object. In view of this, the imaging data collected by the images sensors 54 can further be compared to determine the distance (or depth) to these features of the object via triangulation, a process also known as disparity mapping. The calculated distance to the object can then be referenced in conjunction with the number of pixels comprising the object within the imaging data, as well as and known characteristics of the image sensors 54 (e.g., field of view), to determine the true size of the object.

The present inventors have further recognized that in certain configurations it is advantageous to increase the disparity between the location of features in the imaging data or images captured by each of the image sensors 54 (i.e., improving the ability to accurately determine distances via disparity mapping), it may be advantageous to position the image sensors 54 farther apart on the marine vessel (e.g., 3 feet or more apart) as compared to using a single package stereo-vision camera having the image sensors 54.

Other methods and technologies may also or alternatively be used for identifying the distances to objects within the imaging data. By way of example, LIDAR or other Time-of-Flight technologies may be used to determine the 3-dimensional positions of the key points for calculating measurements.

In addition, or in the alternative, the control system 100 may use "most important object" (MIO) techniques to identify the object of interest for tracking and communicating to the operator, for example those discussed in U.S. Patent Application Publication No. 2020/0160726. Multiple MIOs may also be identified, which in certain examples may be ranked and displayed to have different levels of concern and/or or to show the "top 3" MIOs. For example, another marine vessel at a distance of 300 feet may be of greater concern than a buoy at 100 feet despite being farther away, here due to the potential severity of damage or injury from a collision. Likewise, a buoy at 50 feet but dead ahead may be of greater concern than a buoy at 10 feet that is 10 degrees to starboard, here due to the likelihood of a collision occurring. Similarly, different types of vessels may be characterized to have different levels of concern. By way of example, a coast guard vessel or freight liner may have different thresholds for the different levels of concern than a small consumer fishing boat (e.g., a "high risk" threshold for a freight liner being triggered at a much greater distance to objects than for small fishing boat due to the differences in maneuverability and likelihood of harm from a collision). Limiting the number of objects to track and make the operator aware of can avoid alarm fatigue and over-congestion on the display devices.

Figure 2:
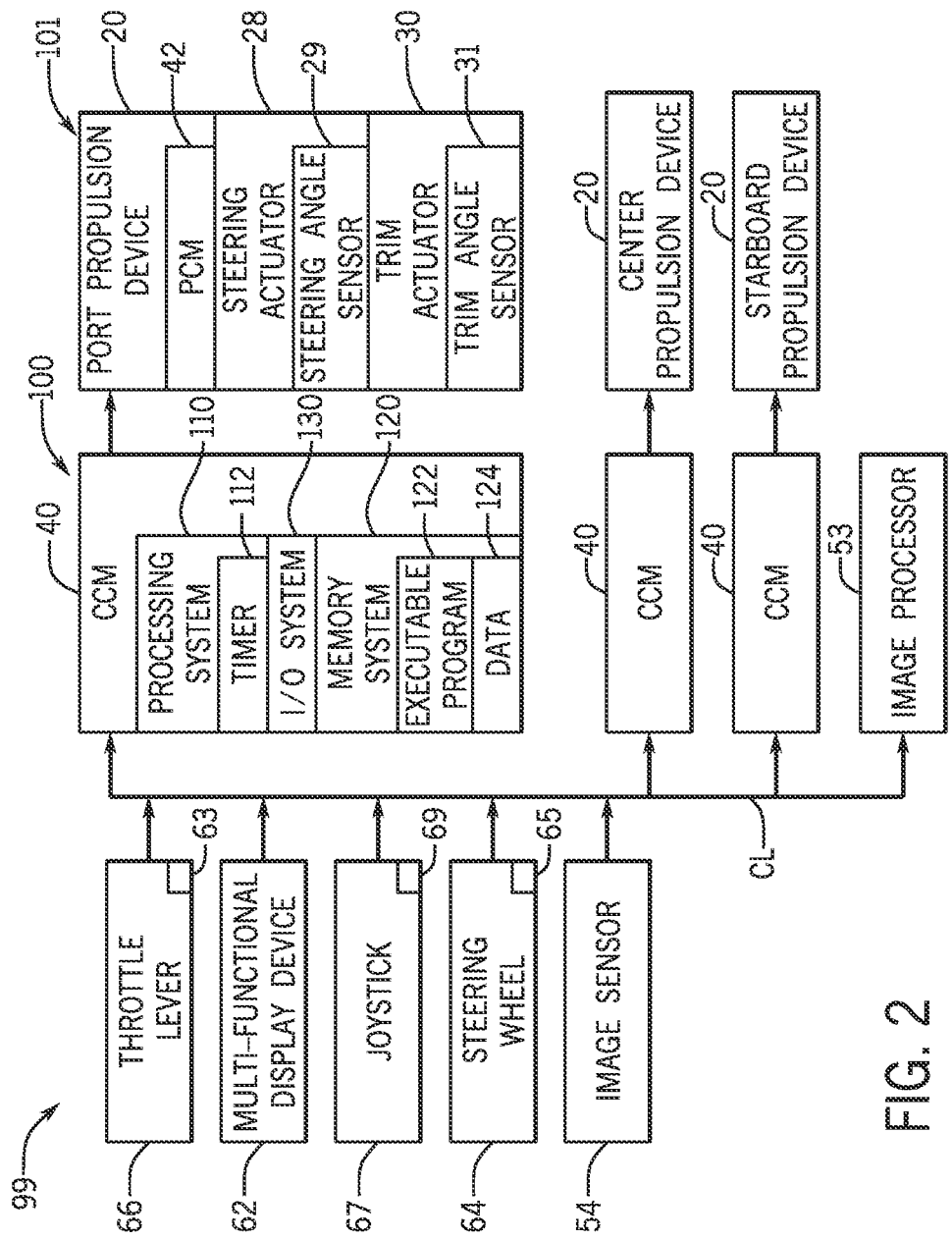
FIG. 2 is schematic view of a control system such as may be incorporated within the marine vessel of FIG. 1.

Referring to FIGS. 1 and 2, the control system 100 may also incorporate information relating to the size, shape, direction, velocity, acceleration, and/or path of travel, or color of features captured by the image sensors 54 to detect an object. For example, determining that an object of interest is a brown color makes that object more likely to be water than a buoy since the latter is designed to be visually stand out from the water. Likewise, "white caps" identified as being vertically above brown, blue, or green colors may be used to identify a wave. The same features may be used to approximate the size and movement characteristics of that wave (e.g., direction, velocity, acceleration, path). In other examples, computer vision techniques are used to compare images from the image sensors 54 to each other and/or to pre-classified examples stored in the memory system 120. Machine learning algorithms may be trained on features that look like items of interest (boats, buoys, waves) and classify incoming images from the image sensors 54 via inference, rather than direct comparison of these incoming images to stored examples.

In certain embodiments, a CVML model is used to recognize the features that define a bow and stern and to train a model for inferring the bow and stern of the marine vessel. Object tracking can also be used to predict the movement of the marine vessel, particularly as the bow is not always pointed in the direction of travel (e.g., the marine vessel could be in reverse, anchored, or translating sideways). The outline of an object may be determined through edge detection or image segmentation. When segmenting an image, the control system 100 may infer the pixel groupings that are likely to be part of certain types of objects using methods presently known in the art.

In this manner, the control system 100 is configured not only to detect the presence of objects, but also additional attributes of those objects, such as: a type of object (e.g., another marine vessel, a wave, a buoy, rocks or a landmass, or a marina), a particular identity of the object (e.g., a specific cliff or channel, sailing vessel "SV ABC", marine slip #4, etc.), a status of the object (e.g., moving versus stationary), a distance to the object, a heading of the object relative to the marine vessel, an absolute location of the object (e.g., by incorporating information from the GPS 50, the speed and direction in which the object is moving (which may also involve incorporating the speed and/or direction of the marine vessel). These attributes may be based on models or lookup tables stored in the memory system 120, and/or learned over time via machine learning within the control system 100. This information can then be used to warn an operator of the object (e.g., an operator of another marine vessel), and/or take evasive action to prevent a collision (e.g., reduce throttle), as discussed further below.

The marine vessel 1 of FIG. 1 includes a helm 60 with operator input devices for controlling various functions of the system 10 and the marine vessel 1 more generally. The operator input devices include a multi-functional display device 62 including a user interface, which may be an interactive, touch-capable display screen, a keypad, a display screen and keypad combination, a track ball and display screen combination, and/or any other type of user interface known in the art. The operator input devices further include one or more steering devices, such as a steering wheel 64 and/or a joystick, configured to facilitate user input (e.g., via the central control module 40, the propulsion control modules 42, and/or a helm control module 68 in a manner known in the art) for steering the marine vessel 1.

A throttle lever 66 is also provided as an operator input device for providing thrust commands, including both a magnitude and a direction of thrust, to the central control module 40. By way of example, rotating the throttle lever 66 in a forward direction away from its neutral, detent position could be interpreted as a value from 0% to 100% operator demand corresponding via an input/output map, such as a look up table, to a position of the throttle valves of the powerheads 22. For example, the input/output map might dictate that the throttle valves are fully closed when the throttle lever 66 is in a first detent position (i.e., 0% demand), and are fully open when the throttle lever 66 is pushed forward to its furthest extent (i.e., 100% demand). As discussed further below, similar methods may also be employed for controlling steering, whereby operator inputs are received from a range of -100% to +100% corresponding to full port and full starboard steering directions, which then cause corresponding steering of the marine propulsion devices 20, in certain examples via a lookup table.

Additional information is now provided for subsystems within an exemplary control system 100, which includes one or more central control modules 40, one or more propulsion control modules 42, the helm control module 68, one or more image processors 53, and/or other controllers, as shown in FIG. 2. A person of ordinary skill in the art will recognize that these subsystems may also be present within additional central control modules 40 (as applicable) and/or propulsion control modules 42 or other controllers within the marine vessel 1. In the example shown, each central control module 40 includes a processing system 110, which may be implemented as a single microprocessor or other circuitry or be distributed across multiple processing devices or sub-systems that cooperate to execute the executable program 122 from the memory system 120. Non-limiting examples of the processing system include general purpose central processing units, application specific processors, and logic devices.

Each central control module 40 further includes a memory system 120, which may comprise any storage media readable by the processing system 110 and capable of storing the executable program 122 and/or data 124. The memory system 120 may be implemented as a single storage device or be distributed across multiple storage devices or subsystems that cooperate to store computer readable instructions, data structures, program modules, or other data. The memory system 120 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example. An input/output (I/O) system 130 provides communication between the control system 100 and peripheral devices, such as input devices 99 and output devices 101, which are discussed further below. In practice, the processing system 110 loads and executes an executable program 122 from the memory system 120, accesses data 124 stored within the memory system 120, and directs the system 10 to operate as described in further detail below.

A person of ordinary skill in the art will recognize that these subsystems within the control system 100 may be implemented in hardware and/or software that carries out a programmed set of instructions. As used herein, the term "central control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A central control module may include memory (shared, dedicated, or group) that stores code executed by the processing system. The term "code" may include software, firmware, and/or microcode, and may refer to programs, routines, functions, classes, and/or objects. The term "shared" means that some or all code from multiple central control modules may be executed using a single (shared) processor. In addition, some or all code from multiple central control modules may be stored by a single (shared) memory. The term "group" means that some or all code from a single central control module may be executed using a group of processors. In addition, some or all code from a single central control module may be stored using a group of memories. As shown in FIG. 2, one or more central control module 40 may together constitute a control system 100. The one or more central control modules 40 can be located anywhere on the marine vessel 1.

A person of ordinary skill in the art will understand in light of the disclosure that the control system 100 may include a differing set of one or more control modules, or control devices, which may include engine control modules (ECMs) or propulsion control modules 42 for each marine propulsion device 20 (which, when applicable, may be referred to as ECMs even if the marine propulsion device 20 contains an electric motor in addition to or in place of an internal combustion engine), one or more thrust vector control modules (TVMs), one or more helm control modules (HCMs), and/or the like. Likewise, certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices.

The control system 100 communicates with each of the one or more components of the marine vessel 1 via a communication link CL, which can be any wired or wireless link. The illustrated communication link CL connections between functional and logical block components are merely exemplary, which may be direct or indirect, and may follow alternate pathways. The control system 100 is configured to receive information and/or to control one or more operational characteristics of the marine vessel 1 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the marine vessel 1. Moreover, the communication link CL lines are meant only to demonstrate that the various control elements are configured for communicating with one another, and do not represent actual wiring connections between the various elements, nor do they represent the only paths of communication between the elements. Additionally, the marine vessel 1 may incorporate various types of communication devices and systems, and thus the illustrated communication links CL may in fact represent various types of wireless and/or wired data communication systems.

As will be discussed further below, the control system 100 communicates with input devices 99 from various components such as steering devices, for example via sensors 63, 65, and 69 that detect the positions of the throttle lever 66, the steering wheel 64, and/or a joystick 67, respectively. The control system 100 also communicates with other input devices, such as the multi-functional display device 62, the GPS 50, the IMU/AHRS 52, and/or image sensors 54.

The control system 100 also communicates with output devices 101 such as the multi-functional display device 62 and other devices as the helm 60 (discussed further below), propulsion control modules 42, steering actuators 28, and trim actuators 30, for example. It will be recognized that the arrows shown are merely exemplary and that communication may flow in multiple directions. For example, the steering angle sensors 29 and trim angle sensors 31, while shown as corresponding to the steering actuators 28 and trim actuators 30, may serve as input devices 99 feeding into the one or more central command modules 40.

Returning to FIG. 1, the helm 60 of the marine vessel 1 includes a dashboard 70 having a multi-functional display devices 62 along with various other displays, gauges, ignition switches, and the like. The multi-functional display devices 62 may be used to display menus and settings for configuring other display devices according to the present disclosure, as discussed below. A windshield 72 is provided forward of the dashboard 70 (also forward of a portion 71 of the helm 60 forward of the dashboard 70), to shield these components from the elements and provide protection for the operator when the marine vessel 1 is underway. In this manner, the windshield 72 is forward facing, but may also wrap around to the side of the helm 60. The present windshield 72 is divided into two portions, one associated with the helm 60 and positioned on the starboard side 8 of the marine vessel 1 as described above, and another positioned on the port side 6 of the marine vessel 1 to provide protection for a passenger.

Figure 3:
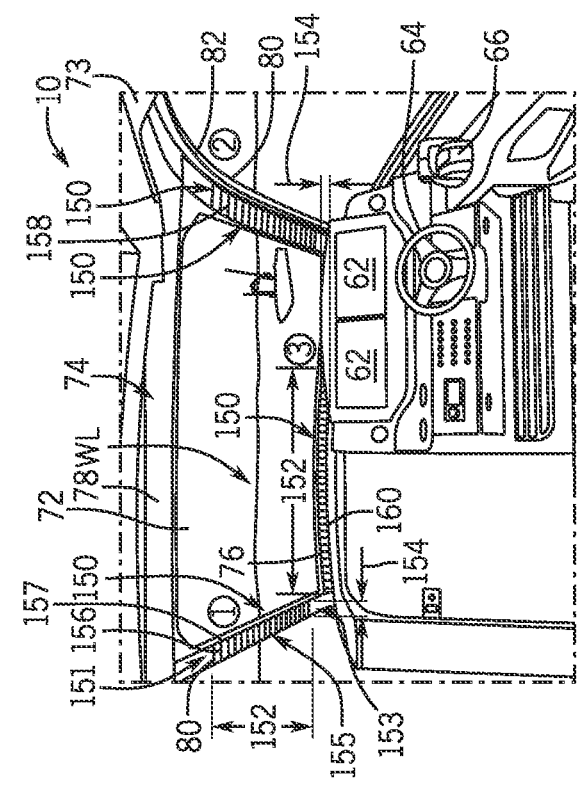
FIG. 3 is perspective view from the helm of the marine vessel from FIG. 1.

The windshield 72 is contained within a frame 74 in a customary manner, which are collectively referred to as a windshield assembly 73. The frame 74 includes a lower member 76, an upper member 78, and side members 80. Specifically, side edges of the windshield 72 are adjacent to and extend parallel to the side members 80 of the frame. Likewise, upper and lower edges of the windshield 72 are adjacent to and extend parallel to the upper member 78 and the lower member 76 of the frame 74. As shown in FIG. 3, the side members 80 may be further divided into "pillars," such as the A-pillars 82 for the forward-most pillars. Additional side members 80 positioned rearwardly from the A-pillars 82 may be referred to as B-pillars, etc.

Through experimentation and development, the present inventors have identified problems with the systems and methods presently known in the art for displaying information in a marine vessel, including low effectivity and an overabundance of alarms and indicators. It should be recognized that the present disclosure may also refer to this "information" as "data." As will be discussed further below, the systems and methods disclosed herein provide improved operator awareness of the information being presented, improved recognition of what the information truly represents and what actions may be needed (and/or with a reduced reaction time), and less congestion and/or confusion with other information being provided (e.g., on the multi-functional display devices 62). Moreover, the present inventors have recognized for marine vessels that currently incorporate some kind of vision system, it would be advantageous to indicate to the user that the vision system have successfully recognized objects of interest (e.g., other marine vessels). As discussed further below, the systems and methods described herein provide for mechanisms by which the user can easily discern whether these objects have been successfully identified, building trust in the system and/or a means for the user to step in as needed. The system may also be used to inform the user when autonomous control is unavailable or cannot be used, for example when conditions are too rough and/or necessary sensors are not available and/or functioning properly.

FIG. 3 illustrates one example of a system 10 configured to assist a user in operating a marine vessel. In particular, FIG. 3 depicts the user's view when positioned at the helm, whereby the system 10 particularly assists the user in identifying an object in an area outside the marine vessel through the windshield 72. In certain examples described below, the system 10 is configured to analyze imaging data from image sensors such as those described above to identify an object within an area outside the marine vessel, and to control a display device to generate a display to visually indicate the object on the windshield assembly. The display assists the user positioned at the helm in identifying the object through the windshield.

The system 10 shows a of FIG. 3 includes at least one display device 150 (here, three display devices 150) for generating a display on the windshield assembly 73 according to the present disclosure. Each of the display devices 150 has an elongated housing having a first dimension 152 that extends between a first end 151 and a second end 153, and a second dimension 154 that extends perpendicularly to the first dimension 152 between a third end 155 and a fourth end 157. The display devices 150 of the illustrated example are supported by the frame of the windshield assembly 73 and positioned to extend adjacently to the windshield 72. The display device 150 includes a rectangular array of lights that are selectively controllable to collectively produce a display (e.g., separate light bulbs, an LCD display, or an LED display). The individual, discrete light elements that make up the display device 150 may be independently controllable with respect to on/off state, intensity (also referred to as brightness or lumens), color, and/or duty cycle (e.g., different timing profiles for on states and off states, including transitions therebetween).

In this manner, a portion 159 of the display device 150 that is producing a display can be controlled, relative to the entire display area, and/or to form different shapes and patterns within the entire display area. Likewise, multiple portions 159 may be displayed independently of each other, which may also be displayed in different manners. For example, the left 25% of the display device 150 may constitute a first display with the right 25% creating a second display and no display being created therebetween. The display device 150 may be configured such that the individual, discrete light elements within the portion 159 generating the display appear to be a single area, for example appearing like a level of mercury within a thermometer. The display device 150 may also be configured to create the appearance of various shapes or patterns, such as forming an arrowhead pointing in the first dimension 152.

Two of the display devices 150 in the system 10 of FIG. 3 are vertical display devices 156, 158 that are integrated within the A-pillars 82 of the frame 74 that supports the windshield 72. The third of the display devices 150 is a horizontal display device 160 integrated into the lower member 76 of the frame 74. It should be recognized that the display devices 150 may be oriented different than shown. It should also be recognized that greater of fewer display devices 150 may incorporated within the system 10, such as within the upper member 78 of the frame 74, and/or within the frame 74 on the port side 6 of the marine vessel 1.

These display devices 150 may be integrally formed with the frame 74 and/or subsequently attached thereto (e.g., using snaps or press-fit features, adhesives, and/or fasteners such as screws). The display devices 150 are electrically coupled to, and controlled by, the control system 100 of FIG. 2 (in certain embodiments via the helm control module 68 and central control module 40). The display devices 150 are therefore output devices 101 of the control system 100 and thus can be used to display information available to the control system 100 (e.g., marine vessel velocity, position, and/or heading, water depth, trim angle, and/or objects detected by the image sensors 54 and image processor 53. While the present disclosure generally describes the display devices 150 as output devices 101, it should be recognized that the display devices 150 may also function as input devices 99, such as touch screen devices configured to input a cruise control speed or heading input.

The display devices 150 are configured such that the operator can select which information to be displayed via the vertical display devices 156, 158 and/or the horizontal display device 160. For each of these display devices 150, the display is produced based on data received from a plurality of sensors, in this case including imaging data from the image sensors 54. The control system 100 may use one or more techniques presently known in the art to determine the specific identity of an object identified by the system 10, as discussed further below.

In certain examples, the operating modes for the vertical display devices 156, 158 include an object collision indicator, a speed mode, and a depth mode (see e.g., FIGS. 5 & 6), which are discussed further below. Likewise, the operating modes for the horizontal display device 160 include an object tracking mode, a GPS mode, and a compass mode (see e.g., FIGS. 8 & 9). It should be recognized that other modes are also contemplated for either display device 150 (e.g., a trim position for the marine propulsion device 20, a trim tab position, a planing level, speaker volume, and/or mpg-type efficiency level). Similarly, the exemplary modes provided herein may be selected for displaying on different display devices 150 than described (e.g., displaying on a horizontal display device 160 rather than a vertical display device 156). In certain examples, the system 10 may automatically change the display mode where safety dictates, such as automatically switching to the object collision indicator mode when a collision is determined by the system 10 to exceed a threshold and/or a threshold risk level, which are discussed further below. It should be recognized that the present disclosure may refer to display or taking action when a compared item exceeds or "is beyond" a threshold irrespective of whether the threshold is triggered by the item being greater or less than the threshold. For example, if the system 10 is configured to take some action when a distance between the marine vessel and the object is less than 50 feet, the present disclosure may refer to taking action when the distance between the marine vessel and the object exceeds or is beyond that threshold. In certain examples, the thresholds are based at least in part on the marine vessel itself, including the hull type, one or more hull dimensions and/or ratios (e.g., a beam to length ratio), and/or a velocity of the marine vessel.

Figure 4:
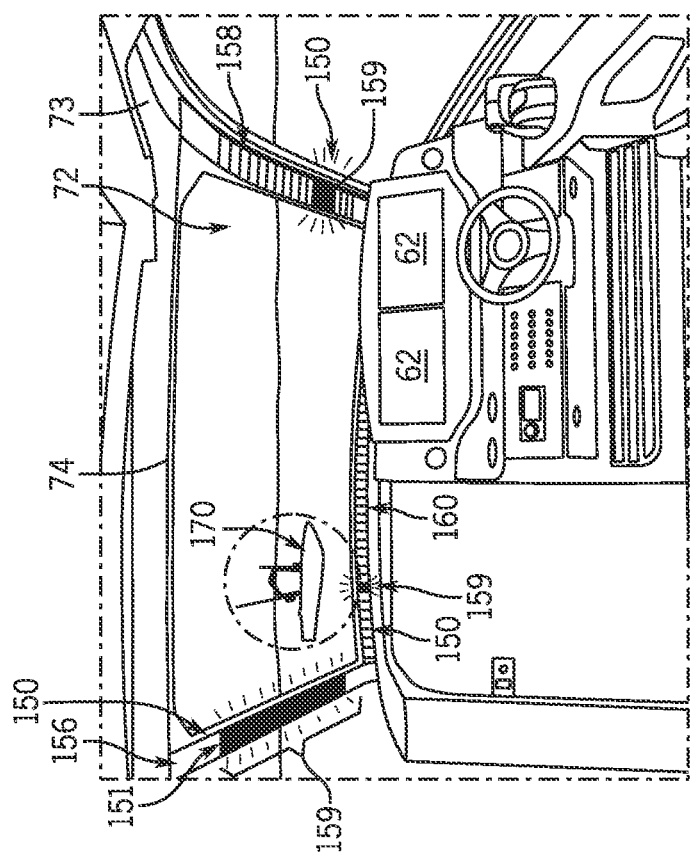
FIG. 4 shows embodiments of operating modes for the display devices of the marine vessel from FIG. 3.

FIG. 4 shows a system 10 in which one vertical display device 156 is operating in a depth mode. The other vertical display device 158 and the horizontal display device 160 are each operating in object collision indicator mode, whereby the displays from the vertical display device 158 and the horizontal display device 160 are positioned to visually align with an object 170 of interest when the object is viewed through the windshield by the user positioned at the helm. In particular, the vertical display device 158 generates a display that is vertically aligned with the object 170 and the horizontal display device 160 generates a display that is horizontally aligned with the object 170 to guide the user in identifying the object 170 through the windshield.

It should be recognized that the present disclosure also contemplates other mechanisms for highlighting the location of the object 170 along the vertical display device 158 and/or the horizontal display device 160, such as showing the portion 159 aligned with the object 170 in a different color and/or flashing as compared to other parts of the horizontal display device 160. The portion 159 may vary by the size of the object 170. Likewise, the particular characteristics of the display within the portion 159, such as brightness and/or color (and/or portion 159 size), may vary based on a distance to the object 170 and/or data from other sensors, such as the velocity of the marine vessel 1. In certain examples in the FIGURES, portions of the display are shown in thicker lines, with illumination lines, and/or other features to distinguish from other portion of the display. These illumination lines shall not be read as limitations, but rather as a mechanism for identifying and/or describing certain aspects of the FIGURES. The present inventors have recognized that providing a display aligned with the object 170 of interest raises the operator's awareness of this object 170, and thus assists in preventing collisions. It should be recognized that in other examples the object collision mode may be selected for different display devices 150 than shown (e.g., indicating the object location only via the horizontal display device 160).

In certain examples, the system 10 further warns the operator that a collision is possible by illuminating an entire display in a particular color (e.g., red), and/or by flashing on and off. The present inventors have recognized that controlling these display devices 150 in this manner draws the operator's attention to the windshield 72, thereby observing the object 170 of interest and/or other information (e.g., the display of the horizontal display device 160).

Figure 5:
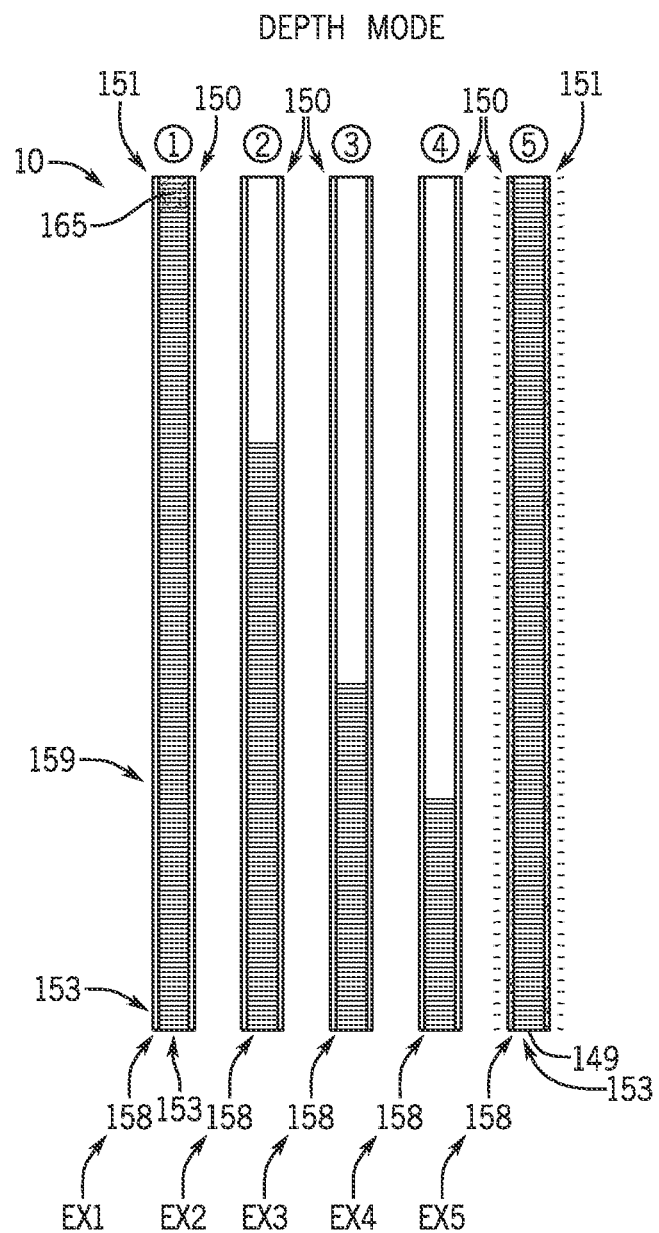
FIG. 5 shows displays for an embodiment of an operating mode for the display devices of the marine vessel from FIG. 3.

FIG. 5 shows a display device 150 in a depth mode based on the data received from sensors relating to the depth of the water (e.g., a conventional depth finder and/or GPS-based data). Specifically, FIG. 5 shows five different examples EX1-EX5 of displays generated by the same vertical display device 158 in the depth mode, which in addition to showing the basic information of depth provide differing levels of warning to the operator. The portion 159 of the vertical display device 158 that is displayed may correspond to a comparison of the measured depth to a threshold or a threshold range for operating the marine vessel 1. In one example, different thresholds are provided for depths of water beneath the propulsor within a range of 0 and 10 feet, which may be provided as depths or as percentages of this range. It should be recognized that this range may be a selectable setting for the operator, whereby for certain vessels having a deeper draft the operator may wish to monitor any depth under 20 feet rather than under 10 feet, for example.

In the examples EX1-EX5 of FIG. 5, the thresholds are provided based on a maximum displayed depth of 10 feet, specifically at 100%, 75%, 50%, and 25% thereof. The first example EX1 shows the portion 159 of the display when at least 10 feet of water is measured beneath the propulsor, such as by a conventional depth finder. The portion 159 of the display device 150 that is generating a display corresponds to the entirety of the range between the first end 151 and the second end 153 of the display device 150, here indicating that there is no caution with respect to depth (e.g., there is at least 10 feet of water beneath the propulsor). In certain examples, the display is shown in light blue to indicate no caution. The top light within this portion 159 may be shown in another color (e.g., magenta) to clearly show the top of each bar formed by the displayed portion 159. This draws the user's attention to the fact that the bar is full.

The second example EX2 shows the portion 159 displayed corresponding to a depth of approximately 7 feet below the propulsor (i.e., here the portion 159 is 70% of the entire displayable area). The control system 100 has been configured such that depths below 75% of the 10-foot threshold correspond to a state or risk level of moderate caution, which may correspond to a different color or other feature as compared to the no caution state. The caution levels may also be selectable by the operator to meet the particular needs of the marine vessel 1.

The third example EX3 shows the portion 159 corresponding to a depth of 4 feet. The control system 100 has been configured to categorize depths under 50% of the 10-foot threshold as corresponding to a state or risk level of increased caution, which again may be shown differently than the two proceeding states (e.g., different color, slow pulsing, etc.).

The fourth example EX4 shows a portion 159 corresponding to a depth measurement of 2.5 feet. The control system 100 associates depths between 25% and 50% of the 10-foot threshold as corresponding to a priority caution state or risk level (portions that are between). Therefore, the display device 150 displays the portion 159 in a different color to indicate this priority caution state or risk level.

If the measured depth is less than 25% of the 10-foot threshold, the fifth example EX5, the control system 100 is configured to no longer display the actual depth in the display device 150, as this may cause the operator to overly-rely on the accuracy of the depth information being displayed rather than seeking deeper waters. Instead, the portion 159 displayed on the vertical display device 158 corresponds to the entirety of the display device 150, now shown in entirely red with pulsing light. A flashing border 149 is also displayed around the perimeter, further raising the awareness of the operator.

In certain examples the portion 159 is updated in real time, as well as the states of warning corresponding thereto, such that when the operator can monitor the display device 150 while navigating.

With additional reference to FIG. 3, in certain examples of the depth mode, the vertical display devices 156, 168 on the two A-pillars 82 display the average or minimum depths for an area slightly wider than the width of the marine vessel (e.g., 5, 10, 15, or 20 feet on either side). The display devices 150 on each side then show the corresponding depth on that side of the marine vessel, indicating to the operator whether or not it is safe to turn the vessel in that direction. Stored GPS maps with corresponding depth information can be used to provide this information of depth on either side of the marine vessel as it navigates through the water.

Figure 6:
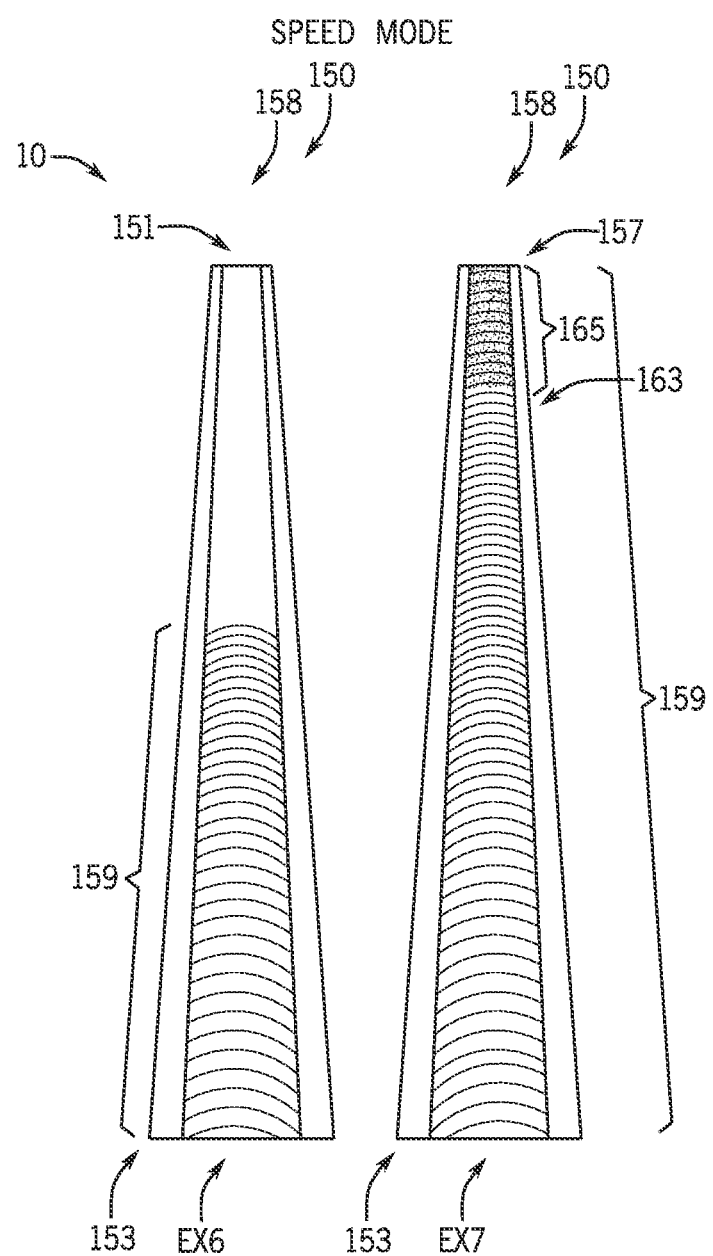
FIG. 6 shows displays for an embodiment of an operating mode for the display devices of the marine vessel from FIG. 3.

FIG. 6 shows two examples of one of the vertical display devices 156, 168 in a speed mode, whereby the display is varied based on speed-related data provided by one or more sensors (e.g., a speed sensor and/or GPS-based speed measurements as known in the art). The portion 159 of the display device 150 being displayed may be a percentage of measured speed versus a maximum speed or versus a threshold speed. For example, the display device 150 may generate a display over a portion 159 that is 50% of the total displayable area when the marine vessel 1 is measured to have a present velocity of 25 mph versus a preset maximum of 50 mph. In another example, the display corresponds to either a throttle position (e.g., the throttle lever being 50% of the way to full throttle), or the present acceleration of the marine vessel 1 as calculated by conventional methods. As shown comparing examples EX6 and EX7 of FIG. 6, the calculated acceleration may also be displayed in different manners (e.g., differing colors, shading, intensities), such as being shown in magenta (shown as area 165 in FIG. 6) when the acceleration exceeds a threshold 163 corresponding to a maximum acceleration (e.g., exceeding 80% of full throttle).

In another example, one or more display devices 150 can be set to a battery charge mode that shows how much charge remains in the battery. In the case of an electric marine drive, this display device may function similarly to a conventional fuel gauge for an internal combustion engine. Similarly, the display device 150 can be set to display a remaining distance or duration for which an electric marine drive may operate before running out of available power.

In another example, one or more display devices 150 can be set to an "eco mode" in which an optimal efficiency (0 to 100%) is displayed. The efficiency may be based on conditions such as boat speed and trim angles. The efficiency may also or alternatively be depicted by changes in color. For example, the display may show up as green as the bar fills up (85%+) to indicate higher efficiency, orange and yellow in intermediate ranges (70-84% and 50-70%, respectively), and red in low efficiency range (below 50%). In certain embodiments, the efficiency may be determined as a function of the direction and angle at which waves are traveling relative to the marine vessel 1, as well as their size (determined in the manner described above).

Figure 7:
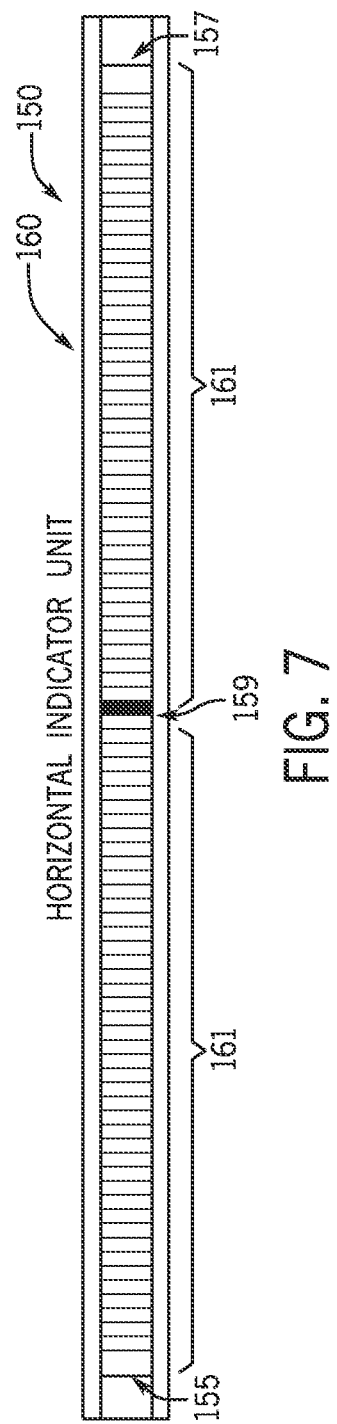
FIG. 7 shows a display of an embodiment of an operating mode for the display devices of the marine vessel from FIG. 3.
Figure 8:
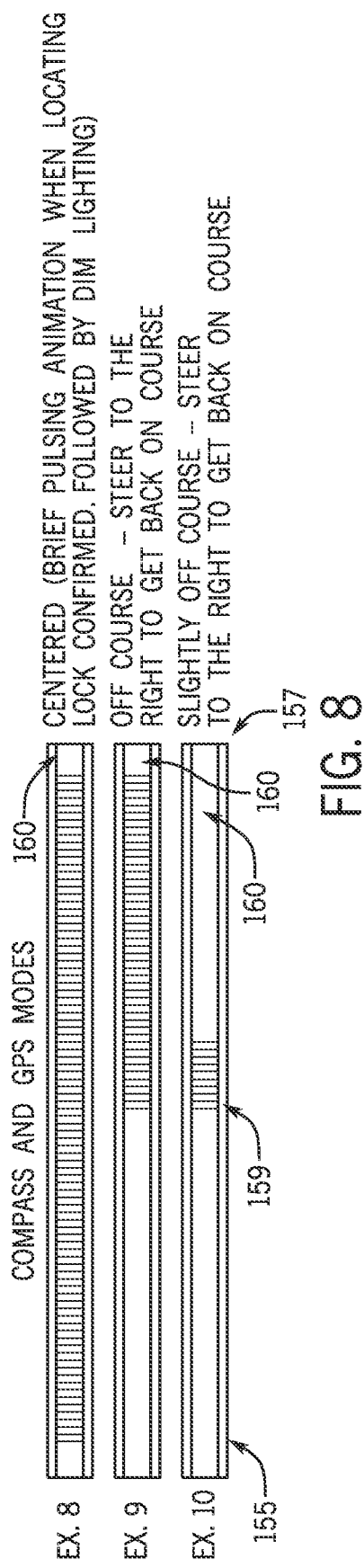
FIG. 8 shows displays for an embodiment of an operating mode for the display devices of the marine vessel from FIG. 3.

FIGS. 7-8 show the horizontal display device 160 operating in different modes. FIG. 7 shows this display device 150 operating under the object tracking mode. By way of example, the object being tracked in the object tracking mode may be another marine vessel, a person (e.g., a skier or a person that has fallen overboard, tracked in the water while the marine vessel navigates to pick them up), a buoy, a marina, a channel, or other objects identifiable by an imaging system such as that described above. Specifically, one portion 159 of the display aligns with the horizontal position of the object being tracked, as discussed above. A secondary portion 161 is also displayed, here as the remainder of the horizontal display device 160 other than where the object is positioned. The portion 159 may be shown in one color, such as magenta, whereas the secondary portion 161 may be shown in another color or style, light blue and at a lesser brightness. It should be recognized that as the marine vessel 1 turns, the portion 159 displayed moves between the third end 155 and the fourth end 157 of the horizontal display device 160. In certain embodiments, multiple different types of information can be shown on the same horizontal display device 160, or even multiple objects when in the presently shown object tracking mode (e.g., with a second object shown in a different color). The colors, brightness, and/or duty cycles may also vary based on the distance to the object, thereby increasing the intensity of the warning for the operator.

The distance thresholds at which colors are changed may be context drive. In certain embodiments, a first color is shown when an object (e.g., another marine vessel) is 10 feet away and both vessels are traveling in the same direction. In contrast, the display device 150 generates a display in a second color that indicates a greater intensity (e.g., red and/or bright versus green and/or dim) when the same object is 10 feet away but traveling in a direction that could eventually lead to a collision.

FIG. 8 shows a compass or GPS mode for operating the horizontal display device 160. Examples EX8-EX10 show a present heading (or an actual heading) as the portion 159 in the center of the display and use the secondary portion 161 to show whether the present heading is centered relative to an intended heading. The intended heading may be based on a destination selected via the GPS. If the present heading is centered relative to the intended heading, the secondary portion 161 will be shown evenly on each side of the portion 159 displayed in the center, as shown in example EX8. In contrast, examples EX9 and EX10 show situations in which the present heading and the intended heading vary by a more than an error threshold (e.g., 3 degrees). In this case, the portion 159 in the center remains, but the secondary portion 161 is shown only on the right side of the portion 159. This assists the user in navigating the marine vessel by indicating that the marine vessel 1 needs to be steered to the right to be on the intended course.

The horizontal display device 160 is configured such that the third end 155 and the fourth end 157 of the display correspond to what would be visible through the windshield 72 to align the displayed portion 61 with the actual object in view when the user is positioned at the helm. In other words, an object is visible through the windshield 72 directly above the displayed portion 61 corresponding thereto in the horizontal display device 160. The size of the secondary portion 161 may vary depending on how far the present heading is off course, the edge of the secondary portion 161 indicating where the portion 159 should be. In this manner, example EX9 indicates the marine vessel 1 having a heading that is 35 degrees to port off course, whereas example EX10 indicates being 12 degrees to starboard off course. The colors or other characteristics of the portion 159 and/or secondary portion 161 may also be varied as a function of the underlying data, as discussed for the other modes above.

In certain embodiments, the intended heading may be determined at least in part as a function of the direction and angle at which waves are impacting the marine vessel. As discussed above, the direction and angle of the waves can be determined via image processing techniques and/or data from the IMU/AHRS 52. As discussed further below, it is generally safest and most comfortable for the marine vessel 1 to have a heading such that the waves impact the port or starboard side at no more than a 45-degree angle, with additional consideration for the size and velocity of both the marine vessel and the waves. Since the marine vessel's hull is typically designed for smooth and stable navigation when propelled forwardly, a wave angle of 45-degree angle or less provides that the waves are principally aligned with this intended direction of travel. In contrast, waves approaching at 90 degrees, or perpendicularly to the sides, impact the hull at the broadest and least hydrodynamic angle, rolling the vessel instead of the vessel slicing through the waves.

In this manner, the system 10 controls the marine vessel 1 and/or guides the user to navigate the marine vessel in a manner that is comfortable and safe, while also traveling to an intended destination. The system 10 may be configured such that a user may enable or disable consideration of the waves in determining the intended heading. In certain embodiments, the system may also display both the most direct intended heading and a proposed heading (e.g., in a different color) that would provide increased comfort and safety in view of the waves.

Figure 9:
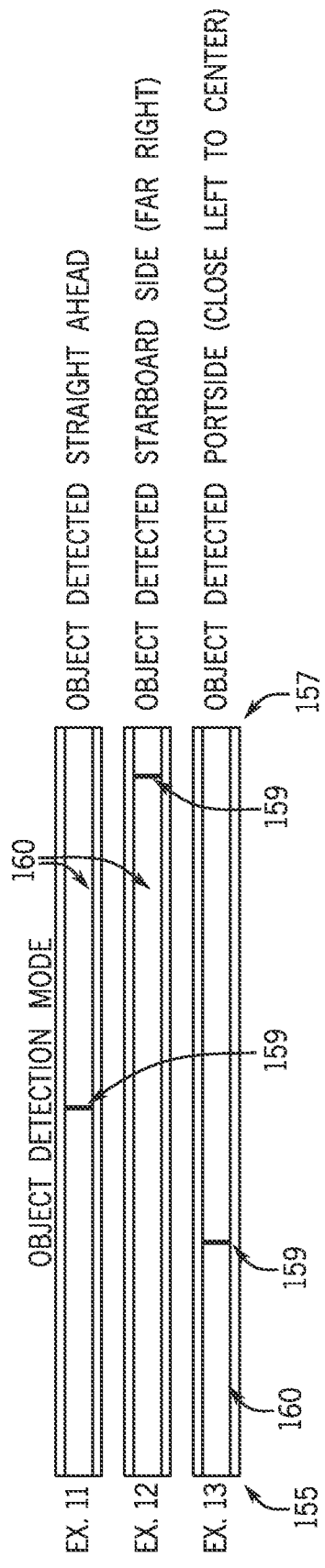
FIG. 9 shows displays for an embodiment of an operating mode for the display devices of the marine vessel from FIG. 3.

FIG. 9 shows another embodiment of a horizontal display device 160 in object tracking mode, but without a secondary portion 161 being displayed. The horizontal display device 160 is configured such that the third end 155 and the fourth end 157 of the display correspond to what would be visible through the windshield 72 (to visually align the displayed portion 61 with the actual object in view when the user is positioned at the helm, such as being seated). Example EX11 shows the object being tracked being dead ahead. Example EX12 shows the object far off to the right, near the right edge of the windshield, while example EX13 shows the object being left, but relatively close to dead ahead.

Figure 10:
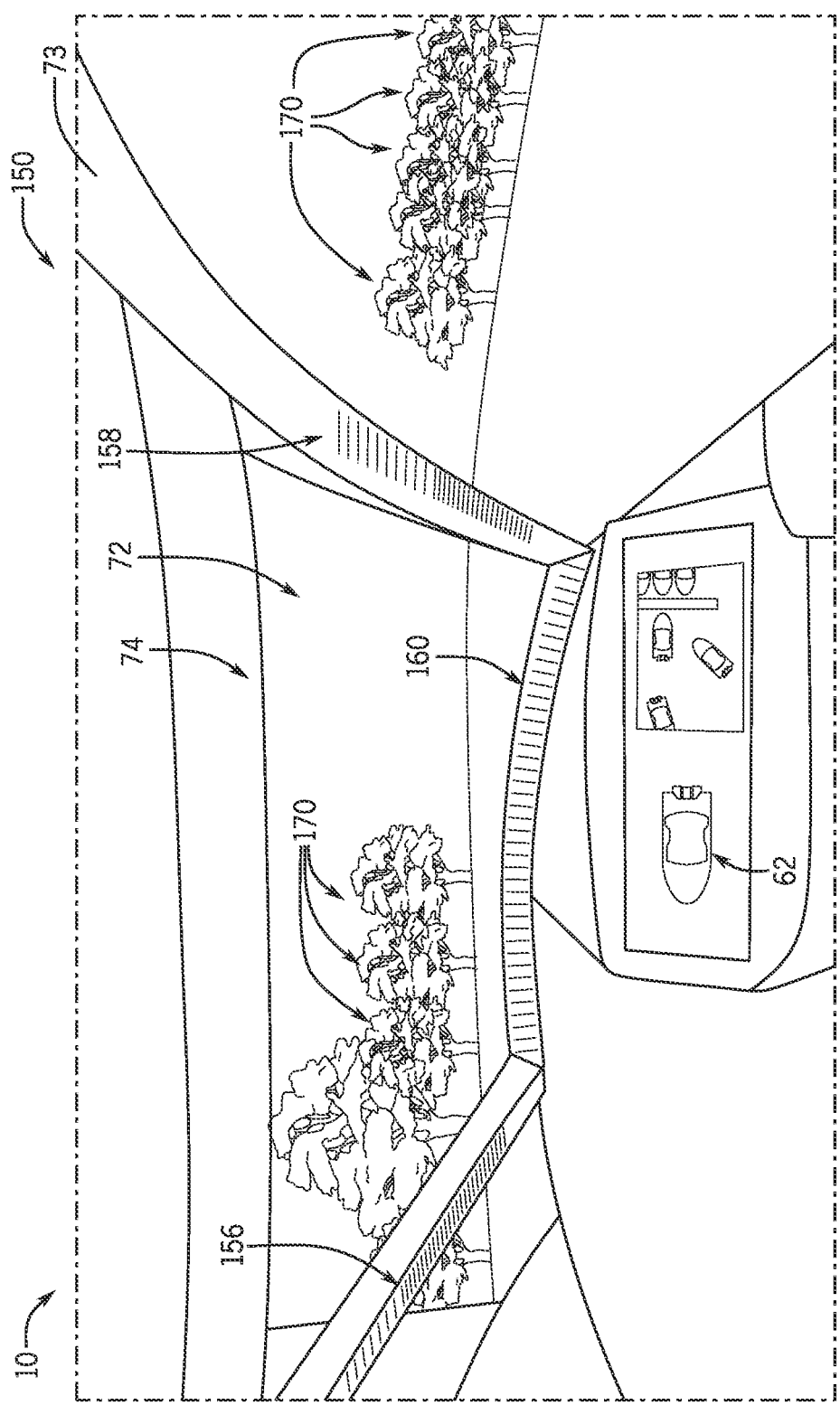
FIG. 10 is a graphic representation of the marine vessel shown from FIG. 3.

FIG. 10 shows an example of a marine vessel incorporating a system 10 according to the present disclosure, specifically including three display devices 150 (vertical display devices 156, 158 and a horizontal display device 160) as discussed above. FIG. 10 depicts what the system 10 may look like at startup, before the various display devices 150 are configured and/or activated to show information for the marine vessel.

Figure 12:
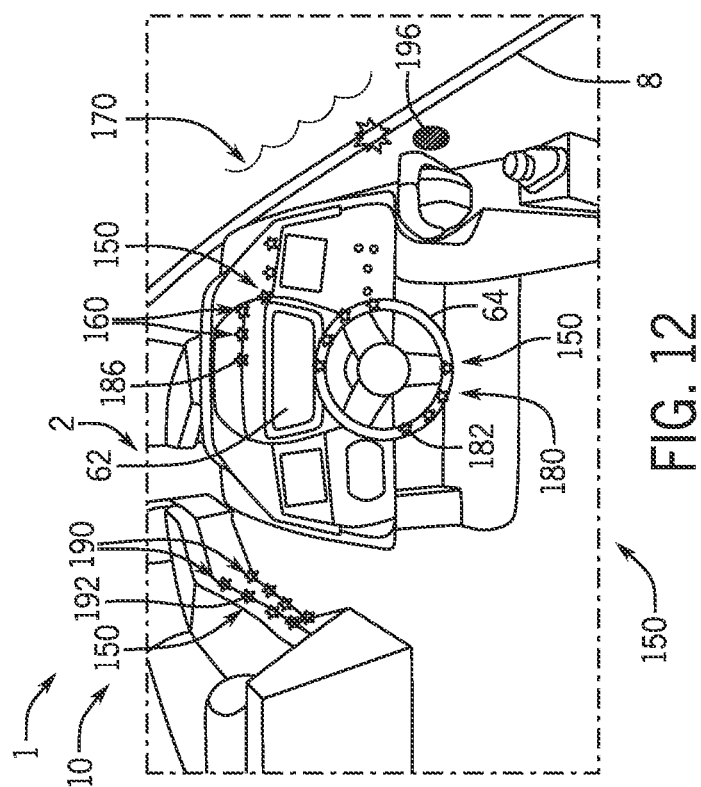
FIG. 12 is a perspective view from the helm of another embodiment of display devices according to the present disclosure.
Figure 11:
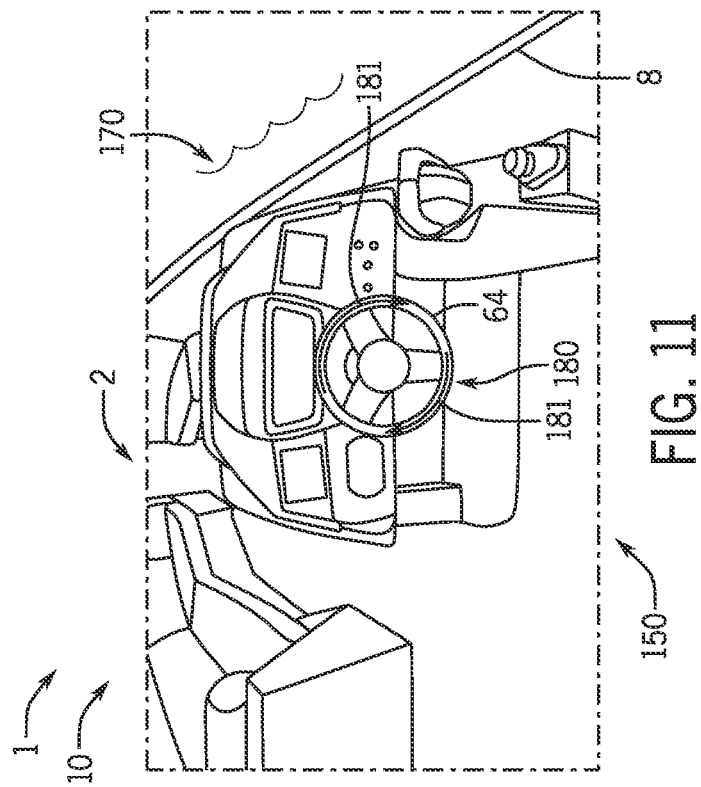
FIG. 11 is a perspective view from the helm of another embodiment of display devices according to the present disclosure.

FIGS. 11 and 12 show a system 10 in which the display device 150 includes wheel indicators 180 incorporated with the steering wheel 64 to display a recommended steering direction for steering the steering device, in certain examples based on the position of an object. The display device 150 comprising the wheel indicators 180 may be in addition to another display device 150 that generates a display on the windshield assembly. In certain examples (e.g., FIG. 12), the wheel indicators 180 are a single row of LEDs spaced at least partially around the steering wheel 64, for example spaced apart by 3 degrees or by 0.25 inches. In another example, the wheel indicators 180 comprises two arrows (see FIG. 11): one pointing clockwise and another pointing counterclockwise. These wheel indicators 180 are controlled to inform the operator which way to steer the marine vessel 1 based on the objects 170 detected by the system 10 described above (e.g., another marine vessel or a wave).

In FIG. 11, the wheel indicators 180 are arrow-shaped lights 181 that selectively illuminate the direction in which the operator should turn the steering wheel 64 to provide the desired effect. The system 10 may determine the direction in which the steering wheel 64 should be turned to navigate the marine vessel towards or away from an object, depending upon what that object is. In the case of FIG. 11, the wheel indicators 180 guide the operator to turn into (or at a particular angle to) objects 170 that are identified by the vision system as large waves. This avoids rolling and capsizing the marine vessel. For example, and as discussed further below, the system may guide the user to change the heading of the marine vessel to be 45 degrees from the direction in which the waves are traveling. The preferred angle for the waves to impact the marine vessel may vary as a function of hull design, wave size, marine vessel velocity, fuel economy preferences, time constraints (e.g., estimated time of sunset), weather predictions, or other factors. However, if the objects 170 are instead identified as rocks, other marine vessels, or unidentified elements, the control system 100 would instead illuminate arrow-shaped lights in the opposite direction such that the operator steers away from these objects 170 to avoid a collision, rather than into them.

FIG. 12 shows an embodiment in which the wheel indicators 180 are individual element 182 that illuminate in an order that simulates motion of the steering wheel 64, again guiding the actions of the operator. The individual elements 182 may turn on and then off in a clockwise order to indicate turning the steering wheel 64 clockwise, and vice versa. FIG. 12 further shows an embodiment of a horizontal display device 160 above the multi-functional display device 62. In contrast to the horizontal display devices 160 described above, this mode is configured such that the portion illuminated (here by individual element 186) show which direction to turn the steering wheel 64 based on the detected object 170. The brightness or color of the individual elements 182 may also vary based on the angle between the current heading of the marine vessel 1 and the object.

In certain embodiments, an audible alarm is also produced (e.g., by a speaker 196) on the side of the marine vessel 1 in which the object 170 is located, here on the starboard side 8. The speakers 196 may be part of an onboard audiovisual system or be a dedicated alarm speaker.

The embodiment of FIG. 12 also provides that, when the object 170 is identified as posing a significant risk to the safety of the marine vessel 1 (e.g., has an identity, size, and proximity determined to be hazardous), safety display devices 190 illuminate to show the operator and occupants the locations of safety equipment such as life jackets and/or life rafts (here, under the port side cushions). The safety display device 190 is shown as a series of individual LEDs 192. In other examples, the safety display device 190 may display the text "LIFE PRESERVERS" and/or an image of a life preserver. The table of FIG. 13 shows an example of how the control system 100 may be configured to control the various display devices 150 as a function of the origin and estimated severity of the object 170 detected.

The present inventors have further developed systems and methods for displaying information from the plurality of sensors described above onto the windshield 72 itself, which may be in addition or as an alternative to the display devices 150 discussed above. FIGS. 14-22 show a system 10 having additional display devices 150, specifically as a heads-up display (HUD) 200 that projects the display onto the windshield 72. The HUD 200 or projection system may be a device presently known in the art, such as those used in aircraft. Various HUD products are available in the market, such as those used as aftermarket kits for automobiles. These devices may plug into OBDII and show speed, RPM, or GPS information, such as the Dodoro 3.5" HUD A2 GPS system.

Figure 14:
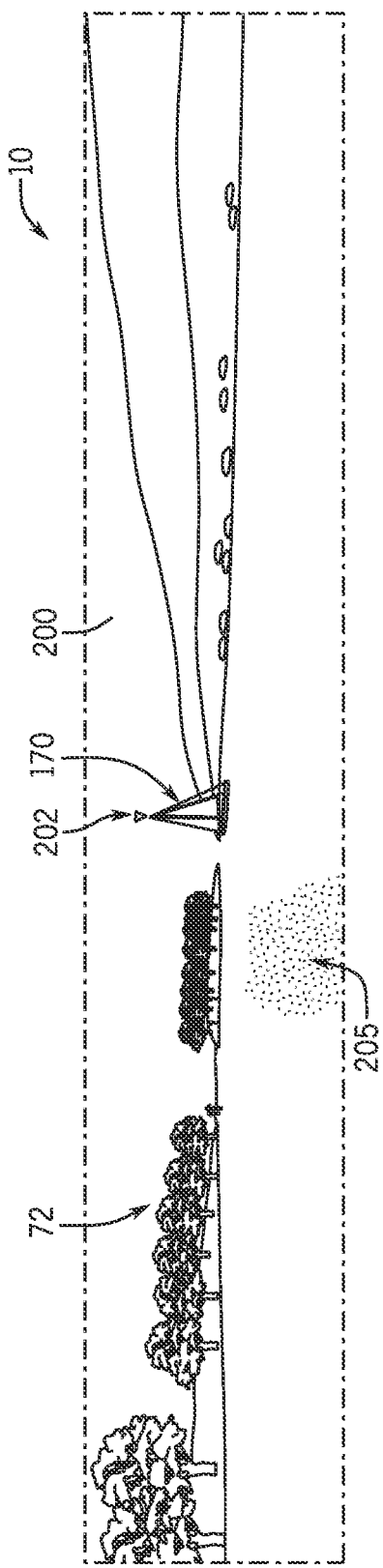
FIG. 14 is a graphic representation of information displayed on a heads-up-display according to the present disclosure.
Figure 15:
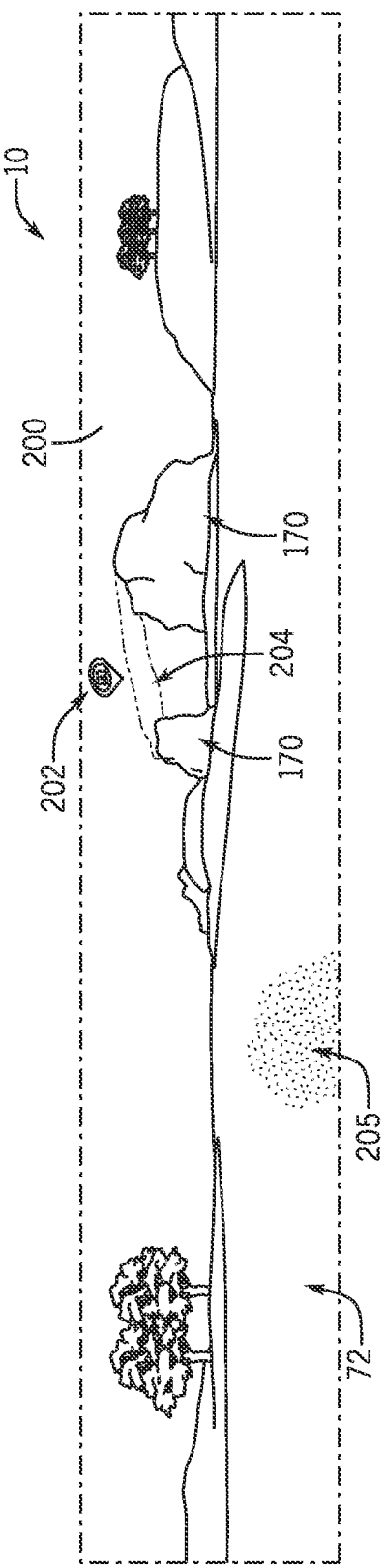
FIG. 15 is a graphic representation of information displayed on a heads-up-display according to the present disclosure.

In FIG. 14, the object 170 identified by the control system 100 (based on imaging data from the image sensors 54 discussed above) is further highlighted for the operator by providing a pointer 202 directly on the windshield 72, here an arrow. In certain embodiments, such as shown in FIG. 15, the pointer 202 includes a logo corresponding to the type of object 170 found. Examples of icons include a boat for another marine vessel, a structure corresponding to a physical feature (e.g., a landmark as shown in FIG. 15, a bridge, etc.), buoys, parking logos for docks, gas icons for fueling locations, exclamation points for rocks, waves, or unknown objects, and/or the like.

In the example of FIG. 15, the object 170 is identified to be Darwin's Arch, a well-known rock formation in the Galapagos Archipelago in the Pacific Ocean. In addition to highlighting this object 170 with a pointer 202 corresponding to a structure, the HUD 200 is shown providing additional supplemental information 204, which here is superimposing a missing portion of Darwin's Arch that has collapsed. The structures may be identified by comparison of the images from the image sensors 54 to a database stored in memory, for example. The database entries for comparison may be limited by GPS information to ensure only reasonable objects are considered (e.g., not showing structures from the canals of Venice, Italy when boating in the Caribbean Sea). Further information may also be shown via the HUD 200, such as a name for the object 170 and/or a text description. Touching the windshield 72 or a multi-functional display of the marine vessel 1 may provide even further information at the operator's request, powered by data stored in a cloud system and/or within the GPS system maps. FIGS. 14 and 15 further show the feature of the system 10 displaying the path 205 of the marine vessel 1 within the HUD 200 (based on the current heading), here by illuminating the water and adding color.

Figure 16:
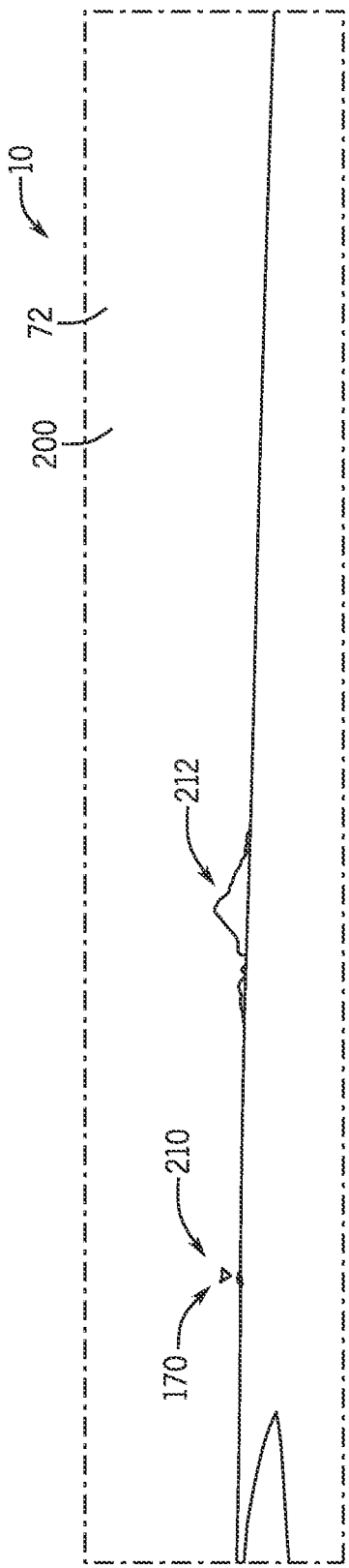
FIGS. 16-17 are graphic representations of information displayed on a heads-up-display according to the present disclosure, here showing a second marine vessel in the distance later being obscured behind a land mass.
Figure 17:
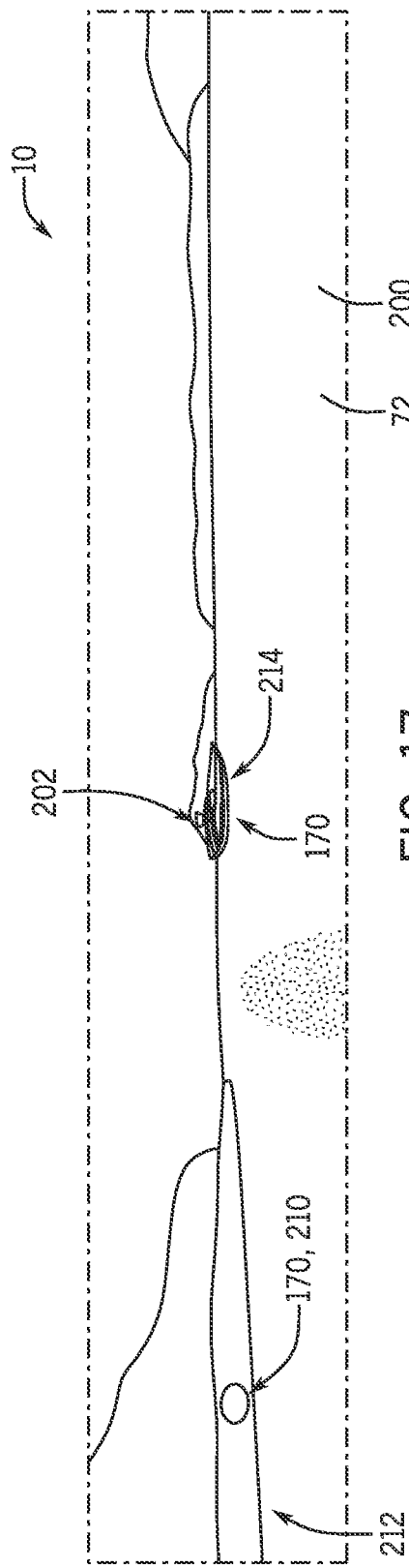

FIGS. 16 and 17 shows the advanced guidance provided by the system 10 via the HUD 200 with respect to avoiding other moving objects, such as marine vessels. FIG. 16 shows a second marine vessel 210 in the distance, presently to the port side of dead ahead, but heading to the starboard side. As shown in FIG. 17, the present marine vessel 1 travels to the right of a land mass 212, obscuring the view of the second marine vessel 210. However, since it is possible for the second marine vessel 210 to emerge from behind the land mass 212 at any time, the system 10 uses the previous travel path and velocity to continue showing the predicted location of this second marine vessel 210 behind the land mass 212. The location of this second marine vessel 210 may also or alternatively be provided by other sources of information, such as an automatic identification system (AIS) aboard both the marine vessel 1 and the second marine vessel 210. A third marine vessel 214 also appears as an object 170, which is also identified and highlighted with a pointer 202 to warn the operator of its presence.

In FIGS. 18-20, the third marine vessel 214 of FIG. 17 is no longer in front of the marine vessel 1 (having left the view of the HUD 200). However, the second marine vessel 210 has now emerged from behind the land mass 212 and is cutting in front of the path of the present marine vessel 1. In FIG. 18, the second marine vessel 210 is highlighted with a pointer 202, which here shows a boat symbol. In addition, an outline 220 is provided superimposed on the second marine vessel 210 on the HUD 200, here following the top of the hull and the cabin areas. More generally, an edge of the second marine vessel 210 as the object is identified via conventional image processing techniques, whereby the display is generated to visually indicate at least part of this edge when the object is viewed through the windshield by the user positioned at the helm. Based on the distance and/or heading of the second marine vessel 210, the outline 220 is shown in FIG. 17 in white. A boundary box may be provided around the object to accommodate for parallax error.

As the second marine vessel 210 gets within a predetermined first threshold of the present marine vessel 1 (which may vary by speed and/or heading, e.g., 50 feet at 20 mph, 100 feet at 35 mph, etc.), the outline 220 changes color to further warn the operator of the potential hazard. Once within a predetermined second threshold of the present marine vessel 1, as shown in FIG. 20 (20 feet at 20 mph, 50 feet at 35 mph, etc.), the outline 220 may change further color, flash, external lights on the marine vessel 1 may be flashed to warn the other operator, and/or audible alarms may be sounded, as described above.

Outlines 220 may be superimposed on any object identified by the system, such as highlighting waves and/or portions of waves, such as white caps of waves as they move across the HUD 200 (for example being detected by edge detection techniques discussed above). A size and/or angle of the waves may also be superimposed above them on the HUD 200, such "6-ft" or "70-degree impact". In certain examples, the display device is configured to generate the display to visually indicate different attributes of the object, including size, speed, and/or direction. The visual indication may include the use of outlines 220 and/or colors thereof, alphanumeric information (e.g., the identity of the object, an icon or symbol indicating the type of the object, the determined height of an object, the distance to the object, the speed of the object, the heading of the object, etc.), a direction of travel for the object (including as an angle relative to the marine vessel), and/or other types of display described herein.

In the example of a wave as the object, the size, speed, direction, and other characteristics of the wave may each have one or more thresholds associated therewith for comparison, which may define the risk levels corresponding thereto. For example, a wave approaching at a moderately concerning angle (e.g., 15-25 degrees, as referred to as a moderate risk level) may be shown in white, whereas a higher concern angle (e.g., 0-14 degrees, also referred to as a high risk level) may be shown in red. Likewise, a wave having an estimated height within a low range (e.g., 1-2 feet, also referred to as a low risk level) may be shown in white, a moderate range (e.g., 2-4 feet, also referred to as a moderate risk level) shown in orange, a high range (e.g., 4-6 feet, a high risk level), and a very high range (6+ feet, a very high risk level) shown in red.

It should be recognized that range classifications for colors and/or other indications to the user may vary based on other factors. For example, a 5-foot wave at a 30-degree angle may be determined to have the same combined level or risk (and thus be displayed in the same manner) as a 3-foot wave at a 15-degree angle. Likewise, the velocity of the marine vessel 1 may impact the classification of a wave of a given size, as discussed further below. Reference tables, algorithms, or other data storage mechanisms may be saved in the data 124 of the memory system 120 of FIG. 2 for comparison to the attributes identified for the wave and the corresponding response via the display and/or automatically modifying operations of the marine vessel such as steering angle or speed.

Figure 21:
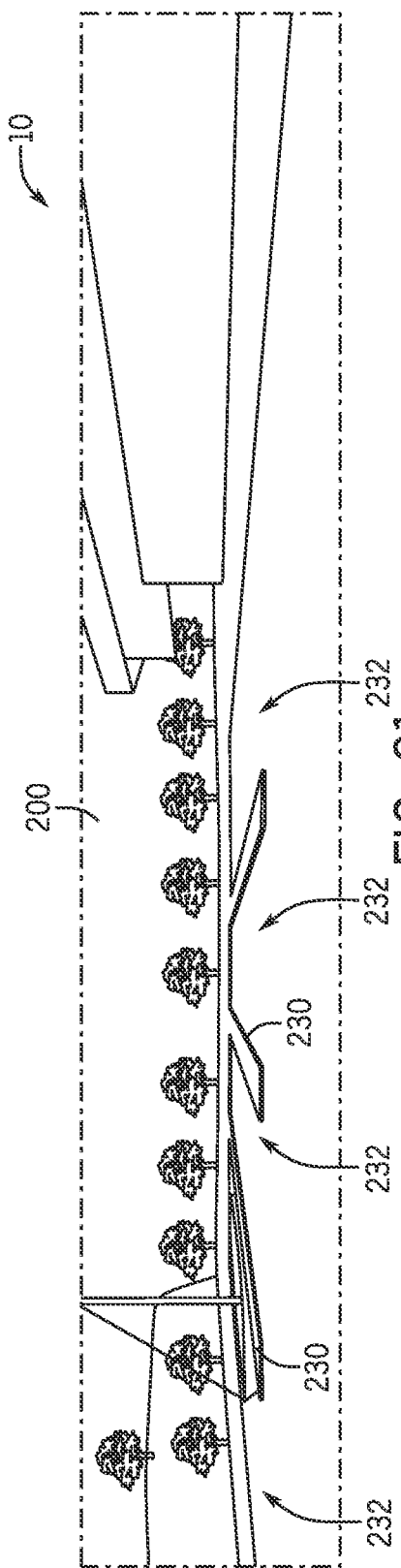
FIGS. 21-22 are graphic representations of information displayed on a heads-up-display according to the present disclosure, here showing available slips for docking the present marine vessel and receiving approval to dock in a given slip.
Figure 22:
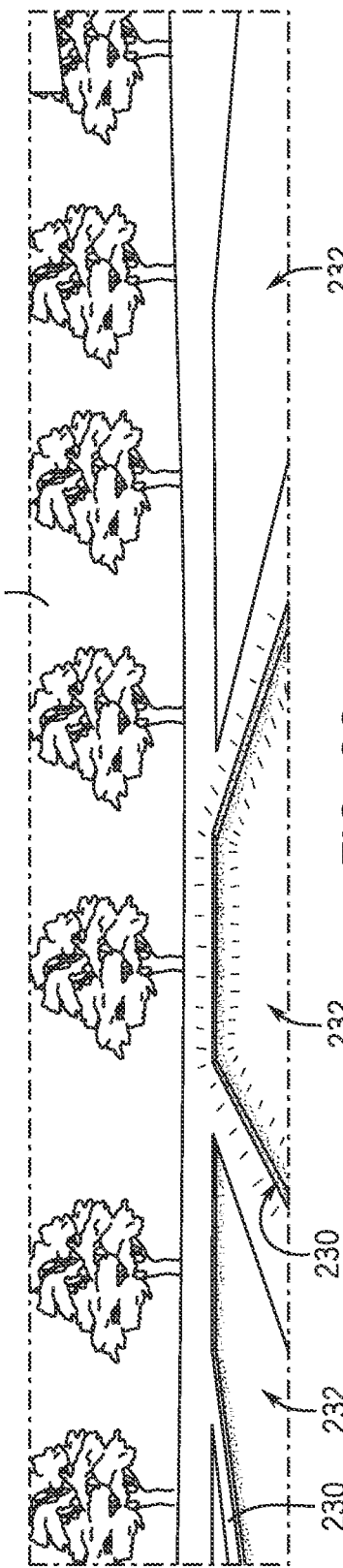

With reference to FIGS. 21 and 22, the HUD 200 is also controllable by the presently disclosed system 10 to help identify slips for docking the marine vessel 1, as well as indicating whether the necessary transactions have been completed for docking. FIG. 21 shows the HUD 200 adding outlining 230 the available slips 232 in a marina, helping the operator to identify these positions (including in the dark). Once the marine vessel 1 approaches a particular slip 232 (e.g., a predetermined distance thereof, for example being within 30 feet), the system 10 communicates with systems at the marina to effectuate the rental transaction seeking permission to park in the slip 232, and in certain embodiments paying for such rental. If permission is granted, the system 10 indicates this acceptance to the operator (in certain examples also signifying a completed payment) by changing the outlining 230 of that slip 232, shown in FIG. 22 as changing the color from light blue to dark blue. The operator may now complete the docking process and proceed to the marina office for check-in as necessary. In other examples, regions of the marina may be outlined or otherwise indicated for where to check in, where to drop off bags, where to refuel, and/or the like.

Figure 23:
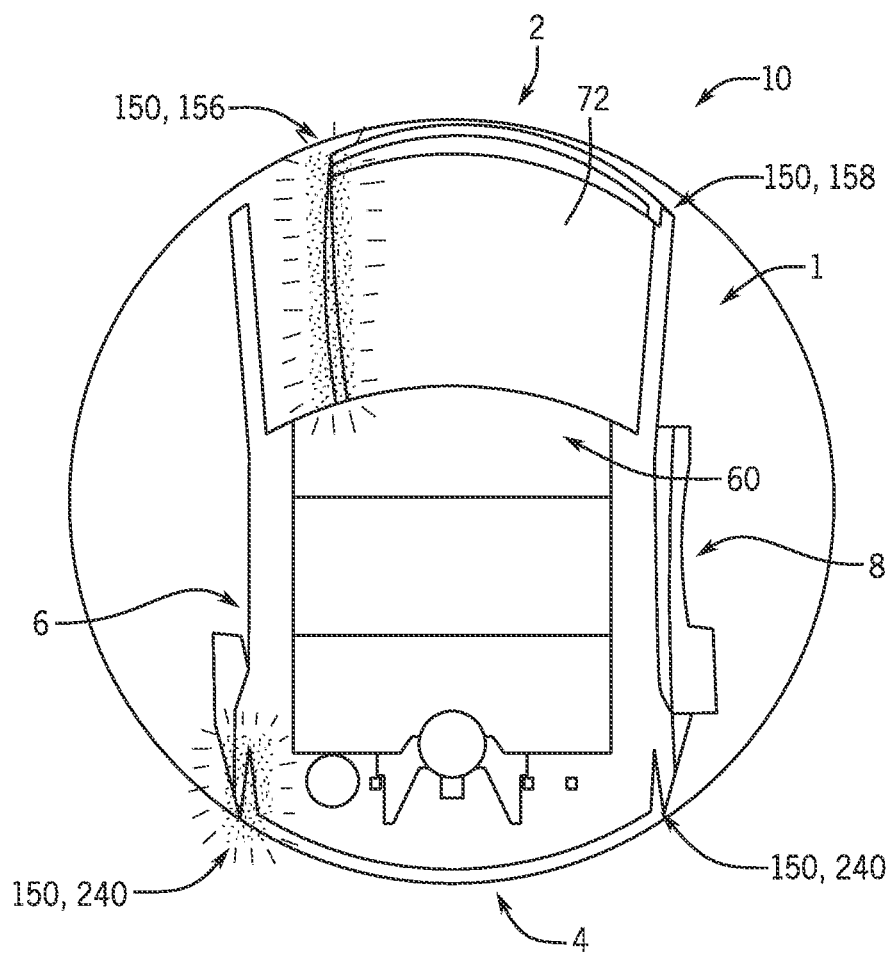
FIG. 23 is an overhead view of another embodiment of system for displaying information according to the present disclosure.

FIG. 23 shows a further embodiment of a marine vessel 1 displaying information for the operator according to the present disclosure, now including display devices 150 other than near the helm 60 and windshield 72 (FIG. 1). In this case, rear display devices 240 are also provided, here at the port side 6 and starboard side 8 rear corners. The rear display devices 240 may be the same as the vertical display devices 156, 158 described above, and may also operate in the same modes. In the example shown, the vertical display device 156 at the port side 6 near the helm 60 is operated in object tracking mode, as is the rear display device 240 on the port side 6 near the stern 4. The two display devices 150 illuminate when an object is identified off the port side 6, changing in frequency based on the distance to the object. The vertical display device 156 and rear display device 240 may provide different displaces from one another, for example with the rear display device 240 being brighter if the object is coming up from behind. This helps to raise the operator's awareness of events behind them, which may be combined with other warning indicators such as speakers to further promote awareness.

Figure 26:
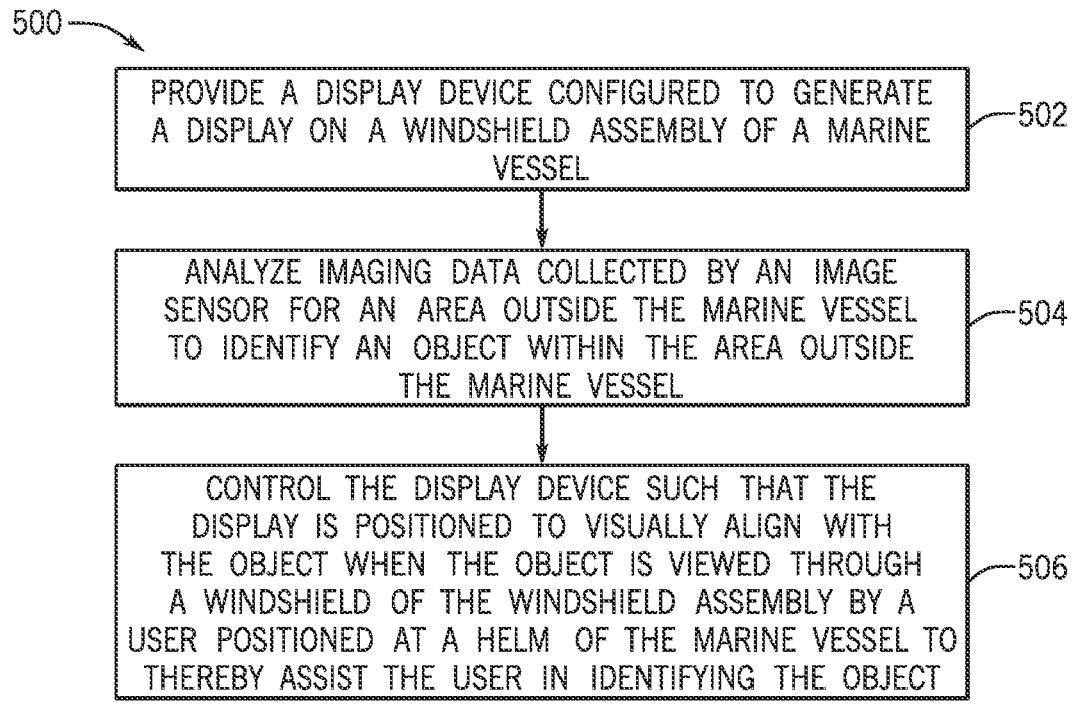
FIG. 26 is a flow chart depicting a method for detecting an object and generating a display positioned to visually align with the object to assist the user in identifying the object according to the present disclosure.

FIG. 26 depicts one method 500 for assisting a user in identifying an object in an area outside a marine vessel, such as by using the components discussed above. In particular, the marine vessel may have an image sensor configured to collect imaging data for the area outside the marine vessel, as well a windshield assembly having a windshield and a frame adjacent to at least one side of the windshield. Step 502 recites providing a display device configured to generate a display on the windshield assembly, particularly on the windshield and/or the frame. Step 504 provides for analyzing the imaging data collected by the image sensor to identify an object within the area outside the marine vessel. The object may be identified via known techniques and/or those described herein. Step 506 provides for controlling the display device such that the display is positioned to visually align with the object when the object is viewed through the windshield by the user positioned at a helm of the marine vessel to thereby assist the user in identifying the object.

The display may be positioned to visually align with the object when the user is located at the helm, such as seated or standing behind the steering wheel, for example. In certain examples, the position of the display is configured for a user of an average height and/or in a predetermined range of seated or standing positions, but may also be adjustable by the user to suit the user's point-of-view. By way of example, the user may use the multi-functional display device 62 at the helm 60 (FIG. 1) to enter in the user's height, and/or to conduct a calibration routine or adjust the position of the display up or down and/or left and right in response to an object until the object and the display are visually aligned vertically and/or horizontally.

The system may be calibrated to ensure the visual alignment of the display relative to the position in which objects appear through the windshield at original installation of the system or assembly of the marine vessel and/or may be calibratable by a user. For example, a test object may be positioned such that when viewed by a test user the object is positioned at an edge or corner of the windshield, whereby the system can then be calibrated or adjusted so that the display indicating that object is positioned at that same edge or corner. In certain examples, the calibration process may be completed at multiple, known distances between the marine vessel and the test object for improved accuracy.

It should be recognized that the present disclosure contemplates generating displays to indicate that an object has been identified other than those visually aligning therewith. By way of example, all display devices may flash to indicate that an object of high importance has been identified, whereby that object need not be visible through the windshield at that moment. For example, this display technique may raise the user's awareness that there is a potential risk for collision with another marine vessel, even if that other marine vessel is off to one side and thus not visible through the windshield (e.g., perhaps approaching from the port side). Likewise, the displays are not limited to assist the user with reject to only objects, but other conditions as well. For example, the display devices may flash to raise the user's awareness of a condition of concern in general, which upon investigating the user will identify to be a critically low fuel level, hazardously shallow water, or other conditions.

The present inventors have recognized that in certain conditions it is advantageous to assist the user beyond notifying them of objects of interest or concern. In some cases, the user may be aware of the notifications or warnings, but not have the knowledge to take the appropriate action (or perhaps the user is making the situation worse). In other cases, the user may be incapacitated or unaware of the notifications or warnings, thereby not having the opportunity to react accordingly. In these cases, it is advantageous to provide further assistance via some amount of autonomous control over various operations of the marine vessel 1.

Figure 24:
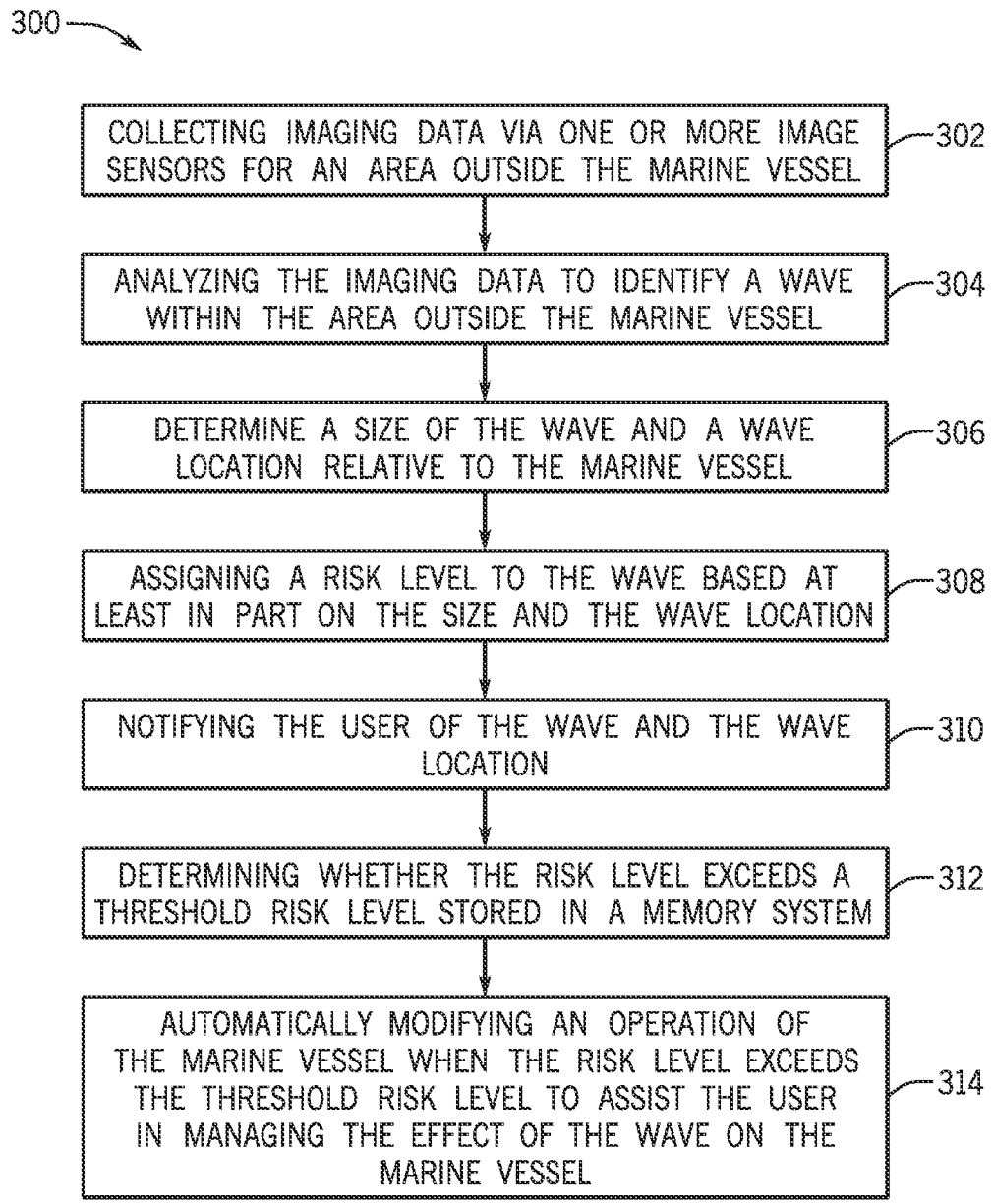
FIG. 24 is a flow chart depicting a method for detecting waves and controlling a marine vessel based on the detected waves according to the present disclosure.

FIG. 24 depicts one method 300 for assisting a user operating a marine vessel according to the present disclosure. Step 302 provides for collecting imaging data via one or more image sensors for an area outside the marine vessel, then analyzing the imaging data to identify a wave within the area in step 304. Techniques for collecting and analyzing imaging data to identify objects outside the marine vessel were discussed above, which in certain examples use stereo-vision cameras and processing techniques. Step 306 provides for determining a size of the wave and a wave location relative to the marine vessel. The boundary of the wave may be determined using edge detection or other object detection methods discussed above or otherwise known in the art. The size of the wave may be determined using stereo-imaging processing techniques to determine the height between a first feature of a wave (e.g., an uppermost feature or another feature such as a white cap) and a second feature of the wave (e.g., a lowermost feature or the point farthest below the first feature). By way of example, the uppermost feature may be determined as the highest point of the wave off the water adjacent to the wave. The uppermost feature may also be determined by comparing the imaging data to the stored images of wave crests. lowermost feature may be determined as a portion of water immediately adjacent to the object identified as the wave, as the same approximate distance from the marine vessel. In another example, the lowermost feature is identified by comparing the imaging data to stored images of wave troughs. The wave location may include both a distance and an angle relative to the marine vessel, such as being 100 feet and 25 degrees to starboard, each determined via the image processing techniques discussed above.

With continued reference to FIG. 24, step 308 provides for assigning a risk level to the wave based at least in part on the size and the location of the wave as determined in step 306. The risk level may be assigned as discussed above for displaying objects identified outside the marine vessel. Risk levels may be stored in reference tables in which risk levels correspond to certain ranges of variables such as the wave size and location. By way of example, a "high" risk level may be assigned to any wave at least 5 feet tall and within 100 feet, any wave at least 7 feet tall and within 300 feet, and any wave at least 8 feet tall regardless of distance. In another example, a high-risk level is assigned when the size of the wave is determined to be increasing by at least two feet while moving 100 feet closer to the marine vessel, particularly while the wave is within the range of distances between 500 and 200 feet from the marine vessel. It should be recognized that these are merely examples and different thresholds and combinations of thresholds may be used for assigning the risk level.

In step 310 the user is notified of the wave and its location, which may be displayed at the helm, provided as an audible warning, or other techniques described above. Step 312 provides for determining whether the risk level assigned in step 308 exceeds a threshold risk level stored in memory. The threshold risk levels are points at which the risk level is sufficient to warrant taking action beyond merely notifying the user.

Step 314 provides for automatically modifying an operation of the marine vessel when the risk level is determined in step 312 to exceed the threshold risk level. In this manner, the method 300 assists the user in managing the effect of the wave on the marine vessel.

In certain embodiments there is more than one threshold or threshold risk level, whereby the threshold or threshold risk level that is exceeded changes how the autonomous control is provided in step 314 and/or how the transition to autonomous control is performed. In one example, when a wave is assigned a "medium" risk level, user approval is required as a further step before the autonomous control for the marine vessel commences. In the case of a "high" risk level, the transition to autonomous control is automatic, but includes an 8 second delay countdown during which the user may select a cancel or override option to prevent the autonomous control. The countdown may be displayed at the helm and/or provided as an auditory notification. In a "severe" risk level, the transition to autonomous control may occur after a shorter countdown (e.g., 2 seconds), or may immediately begin while indicating to the user that the transition is occurring. Additional detail with respect to how autonomous control of the operation may be performed for step 314, as well as the transition to autonomous control, is provided below.

Figure 25:
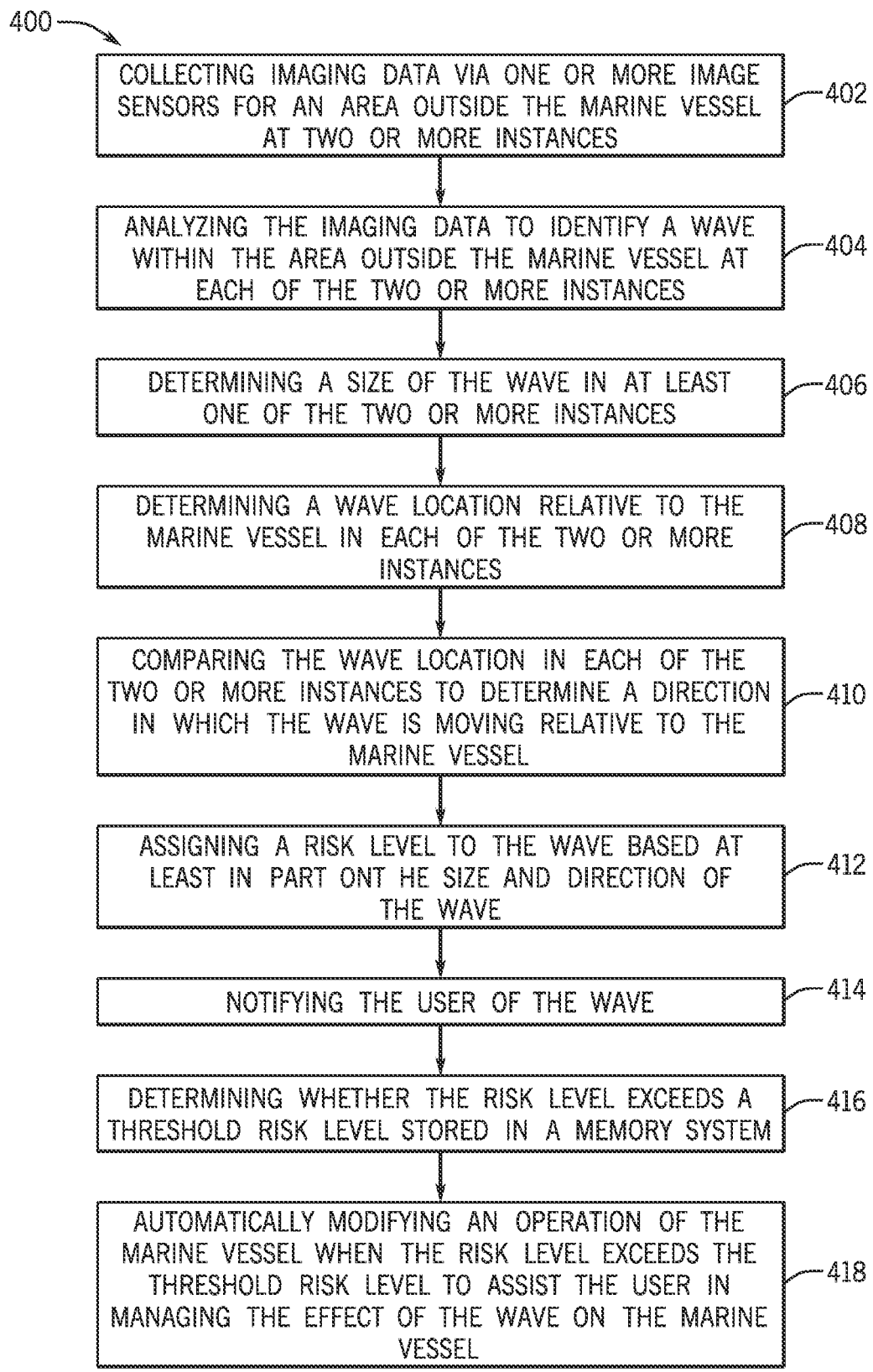
FIG. 25 is a flow chart depicting another method for detecting waves and controlling a marine vessel based on the detected waves according to the present disclosure.

FIG. 25 depicts another method 400 for assisting the user operating a marine vessel according to the present disclosure. Steps 402 through 406 may be performed in a similar manner as steps 302 through 306 for the method 300 described above. However, in contrast to the method 300, the method 400 particularly collects and analyzes imaging data from two or more instances in time. As will become apparent, this allows tracking of the waves over time to determine direction, velocity, acceleration, and changes in the size and/or shape of the wave. In step 408, the location of the wave is then determined at each instance, whereby these locations are then compared in step 410 to determine a direction in which the save is moving relative to the marine vessel. Step 412 proceeds similarly to step 308 from the method 300, but whereby the risk level is assigned to the wave based at least in part on the direction of the wave's movement rather than an instant location of the wave. It should be recognized that both location and direction may be considered while assigning the risk level to the wave, along with the size of the wave and other factors discussed herein.

The user is notified of the wave in step 414, which may be performed in a manner similar to the step 310 discussed above. Step 416 then provides for determining whether the risk level exceeds a threshold risk level stored in memory, similar to step 312. It should be recognized that the threshold risk level may be multiple threshold risk levels, which as described above may result in correspondingly different responses by when exceeded.

Step 418 provides for automatically modifying an operation of the marine vessel when the risk level is determined in step 316 to exceed the threshold risk level. In this manner, the method 400 assists the user in managing the effect of the wave on the marine vessel.

Additional information is now provided for how a system, which may include the control system 100 shown in FIG. 2, may perform methods such as those shown in FIGS. 24 and 25 to assist the user in handling an object identified in a manner described above or otherwise known in the art. In certain examples, this object is particularly a wave and assistance is provided to the user to manage the effect of that wave on the marine vessel. In certain examples, this assistance may be provided as notifications, recommendations for user actions, and/or automatically modifying an operation of the marine vessel such as steering angle, trim angle, or velocity.

The control system 100 of FIG. 2 is configured to control operations of the marine vessel via inputs received during manual control (e.g., using the steering wheel 64) and via autonomous control as disclosed herein. The control system 100 can control the velocity of the marine vessel 1 by adjusting the output or RPM of a powerhead 22 within one or more marine propulsion devices 20. In particular, the control system 100 may adjust the control of the powerheads 22 via drive-by-wire systems known in the art. The control system 100 can also control the heading of the marine vessel 1, such as by controlling the steering actuator 28 of one or more marine propulsion devices 20. These controls may be made via drive-by-wire systems known in the art. Additionally, the control system 100 can control the pitch of the marine vessel 1 by adjusting the trim angles of the one or more marine propulsion device 20 (e.g., via the corresponding trim actuator 30). Controlling other operations is also contemplated by the present disclosure (e.g., the control of trim tabs). Likewise, the control system 100 may control multiple operations together, such as controlling the RPM of the powerhead 22 and the trim actuators 30 to together cause the marine vessel 1 to get up onto plane.

The control system 100 is also configured to automatically modify one or more operations of the marine vessel 1 according to the present disclosure, such as to minimize the impact of the waves on the safety and comfort. For example, the control system 100 may reduce the velocity of the marine vessel 1 to reduce the force at which the waves strike the hull. In other cases, the control system 100 may determine that increasing the velocity will either provide better timing with the frequency of waves approaching the marine vessel, and/or will allow the marine vessel to better skim across the tops of the waves (including by causing the marine vessel to plane). In general, greater distances between the waves tends to suggest lower to moderate marine vessel velocities to avoid jumping off each wave. In contrast, a higher marine vessel velocity is advantageous for waves having a higher frequency (i.e., less distance between them) to prevent the marine vessel from dropping between waves.

The optimal marine vessel velocity may be determined via modeling or algorithms that estimate the marine vessel's rise and fall off of the waves for minimizing pitch and/or roll. The modeling or algorithms may be provided as a function of wave size (height), wave frequency, wave velocity, wave angle, hull dimensions (including length), hull mass, hull geometry, trim angle, and other factors. The control system 100 may also monitor the effects of adjustments on the pitch and/or roll measurements collected by the IMU/AHRS 52, which serves as a feedback loop for further adjustments to minimize the pitch and/or roll of the marine vessel 1.

The trim angles of the marine propulsion devices and/or trim tabs can also be adjusted to vary the pitch and/or roll of the marine vessel 1 encountering waves in the water. In particular, the trim angle impacts whether the marine vessel 1 planing, particularly at higher speeds. When the marine vessel 1 is planing, less of the hull is in the water and the marine vessel 1 is better able to skim across the tops of the waves, rather than plowing through them. However, the trim angle can also increase the pitch of a marine vessel 1 at lower velocities, even without the impact of waves. This increased pitch is then further exacerbated by striking against waves, potentially resulting in an unsafe or uncomfortable ride.

In view of this, lower speeds and/or a greater distance between waves may generally indicate trim angles corresponding to the propulsors being lower in the water. However, models and algorithms may again be used to determine the optimal trim angle as a function of wave size (height), wave frequency, wave velocity, wave angle, hull dimensions (including length), hull mass, hull geometry, marine vessel velocity, and other factors. Pitch and roll measurements from the IMU/AHRS 52 may also be used in a feedback look for further controlling the trim actuators.

Regarding controlling the steering actuators 28, the control system 100 may determine that the impacts of the waves would be reduced (e.g., being safer or more comfortable) by changing the angle at which these wave impacts the marine vessel 1. With reference to FIG. 1, angles of the present disclosure are referenced relative to the impact on the port side 6 or starboard side 8 of the marine vessel 1. Since marine vessels 1 are typically designed to travel along the longitudinal axis LON running from bow 2 to stern 4, it is the "broad side" impact of waves that risks capsizing the marine vessel 1 and/or causing the greatest discomfort for passengers. Therefore, waves approaching the port side 6 or starboard side 8 perpendicularly are referred to as corresponding to a 90-degree angle, whereas directly approaching the bow 2 corresponds to a 0-degree angle. Likewise, waves impacting the marine vessel 1 halfway between the latitudinal axis LAT and the longitudinal axis LON are referred to as having a 45-degree angle.

The present inventors have recognized that, in many cases, it is advantageous for the waves to impact the marine vessel 1 at an angle between 0 and 45 degrees. As discussed above, this provides that the angle at which the wave meets the hull is predominately the direction in which the hull is meant to travel. Therefore, the control system 100 may recommend that the user adjust the steering angle such that the waves impact the marine vessel 1 within this range of 0-45 degrees or control the steering actuators 28 to automatically provide this result.

In certain embodiments, the control system 100 will first recommend adjustments and/or control the steering actuators 28 to achieve an initial target angle (e.g., 30 degrees). The initial target angle may be determined as a function of marine vessel 1 size and shape, the size of the waves, the velocity of the marine vessel 1, the intended destination of the marine vessel 1, and/or other variables. In certain embodiments, these variables are provided as inputs to reference tables, models, and/or algorithms for determining the initial target angle that will result in the minimal estimated pitch and/or roll. These reference tables, models, and/or algorithms may be empirically derived for a given size and type of hull, which may be further expanded through machine learning as the effects on pitch and roll are later determined. In other cases, the first recommendation has a fixed value for a given marine vessel (such as 30 degrees for a 24-foot runabout and 20 degrees for a 16-foot runabout).

Whether the first recommendation is calculated or provided as a fixed value, the control system 100 may then provide subsequent target angles for the waves impacting the marine vessel based on the actual pitch and roll data measured from the IMU/AHRS 52. In this manner, the control system 100 may fine-tune the control of the steering actuators 28 to find the wave impact angle that provides for minimal pitch and roll. The process may remain ongoing, may be updated when the heading or velocity of the marine vessel is determined to change, or may be updated as the direction and/or size of the waves is determined to change. As discussed above, the angle selections and current variables (wave size, velocities, etc.), along with the resulting pitch/roll measurements, may be used to improve the reference tables, models, and/or algorithms for future use.

In certain examples, the control system 100 is limited in the particularly ranges it may control the steering angles, velocity, and/or trim angles, which may vary between manual control and autonomous control modes of operation. These limitations may be provided by the user (e.g., allowing up to 10% adjustments in either direction of the setting before autonomous control was initiated), and/or determined by the control system 100 in consideration of other control needs. For example, the control system 100 may be limited to controlling the steering actuators 28 such that the marine vessel remains within a distance or percentage of a planned route of waypoints. Likewise, the control system 100 may be limited to a certain range of about a preferred or energy-efficient velocity. These control limitations may be set to ensure that the marine vessel will reach a target destination within a given time (or projected amount of fuel or energy consumed), to avoid land and other obstacles, to generally follow an intended path (e.g., remaining within designated channels and/or the like), to ensure that the marine propulsion devices have sufficient clearance, and/or other considerations.

As discussed above, the control system 100 may provide recommendations for manual user adjustments or may provide autonomous control of different operations of the marine vessel. In the case of providing recommendations, the control system 100 may provide notifications to the user in many ways, including those discussed above (e.g., wheel indicators 180 on the steering wheel or highlighting objects in the HUD 200). A prompt may also be provided on the multi-functional display devices 62 (e.g., "RECOMMENDED TO TURN 20-degrees to Starboard/Right", "RECOMMENDED TO TRIM UP 10%", AND/OR "RECOMMENDED TO INCREASE SPEED TO 30 MPH"). The determination of what specifically the control system 100 recommends to the user was detailed further above, which may be based on reference tables, models, algorithms, and feedback from the IMU/AHRS 52.

The control system 100 may also display a soft button through which the user may approve autonomous control to provide the recommended action rather than making the change themselves. This approval may be limited to the control system making one discrete modification rather than the user approving the marine vessel to enter an autonomous control mode that will continue beyond that discrete action. In other words, selecting an approval button may automatically turn the marine vessel 20 degrees to starboard, but then immediately return to manual operation.

If no user action is taken after providing recommendations, which may include the user not actively dismissing or declining the recommendation, the control system 100 may be configured to automatically modify operation of the marine vessel to achieve the recommended adjustment. As stated above, it may be that the user lacks the knowledge and/or is not capable of performing the recommendation, thereby needing additional assistance. There, the control system 100 may be configured to provide autonomous control without approval from the user in the moment.

The present inventors have identified that the transition between manual and autonomous control (also referred to as automatically modifying an operation of the marine vessel) to achieve the desired adjustment must be handled with care to ensure safety and comfort for the user and passengers. In certain examples, the system requests approval from the user before the control system 100 will proceed with automatically modifying operations of the marine vessel. In other embodiments, the control system 100 is configured to provide a notification or warning to the user that autonomous control will begin after a predetermined time has lapsed. In further examples, the system is configured such that the user may provide an override command within that predetermined to prevent the operation from being automatically modified. For example, once attributes of a wave or another object are compared to corresponding thresholds and determined to be beyond those thresholds, a warning and countdown may be provided on the multi-functional display devices 62 at the helm 60 (FIG. 1). The warning may say "AUTONOMOUS CONTROL WILL COMMENCE IN", followed by a 6-second count down in the case of 6 seconds as the predetermined before autonomous control will begin. A large "CANCEL" or "OVERRIDE" button may appear under the warning, allowing the user to disable the feature and prevent the control system 100 from providing this autonomous control. Likewise, an "ACCEPT" or "ENGAGE AUTONOMOUS CONTROL" may be provided to allow the user to engage autonomous control without further delay.

The control system 100 may also provide an indication once the autonomous control begins, warning the user that some operation of the marine vessel is about to be adjusted. This may be provided as an audible and/or displayed warning, which may be generic such as "AUTONOMOUS DRIVING ACTIVATE", or more specific, such as "ADJUSTING SPEED" or "WARNING! SYSTEM AUTOMATICALLY CHANGING STEERING ANGLE".

In certain embodiments, this cancelling or overriding may last for a predetermined amount of time (e.g., 10 minutes), or may be effective only until the risk level determined by the control system increase. For example, if the user overrides autonomous control when the risk is deemed to be moderate, a new warning may be provided (requiring a new overriding action by the user) if the risk is determined to rise to a higher risk category. The details regarding assigning risk to the identified object may vary, as discussed above.

The present disclosure contemplates other mechanisms for warning the user, as well as other protocols for when and how the system transitions into an autonomous control mode in which an operation is automatically modified. For example, the countdown time (or other aspects or the warning) may be adjustable by the user, and/or may vary depending on the level of risk assigned to the object. The countdown may also vary based on the distance between the marine vessel and the object, especially in the case of a one-off wave (e.g., one rouge wave) versus consistent, repeated waves. By way of example, the countdown may be 10 seconds for a medium risk level (e.g., a distance being beyond, or closer than, a medium threshold) and 5 seconds for a high-risk level (e.g., being beyond a high threshold). The countdown may also be a fixed value set at the factory or selectable by the user. The countdown may be provided on the multi-functional display device 62 at the helm, may be provided as an audible countdown, and/or other means, such as wirelessly communicating to a smartphone or watch paired with the control system 100.

The control system 100 may in certain cases also be configured to instantly engage autonomous control when needed, rather than waiting for a countdown timer. For example, this may be permitted when the marine vessel 1 is operated in a station-keeping or waypoint following mode in which the user is already anticipate at least some amount of autonomous control. The user may also proactively enter an "autonomous ready" mode in which the marine vessel is manually operated but permitted to provide autonomous control as needed based on object detection. This may be particularly advantageous if the user plans to step away from the helm 60, such as to use the bathroom or check a fishing line.

The control system 100 may be further configured to monitoring the attributes of the object relative to the corresponding thresholds (e.g., a size and/or the location of a wave versus the corresponding thresholds) and to discontinue automatically modifying the operation of the marine vessel when the size and/or the location is no longer beyond the thresholds. In other words, the system automatically returns to manual control of the operation after the risk of the identified objects fall below the threshold or threshold risk level associated with requiring warnings and/or autonomous control. For example, once the velocity, trim, and/or steering angle is adjusted from a first setting to a second setting (e.g., a powerhead speed of 2500 RPM to 2800 RPM), the control system 100 may return to the first setting and manual operating mode. This may be particularly advantageous in circumstances in which the waves are of a relatively consistent size and traveling at a relatively consistent angle. In other cases, such as responding to a one-off wave, the control system 100 may temporarily adjust operation of the marine vessel until that wave is no longer of concern, at which point the previous heading, velocity, and/or trim angle may be restored automatically.

As with warning the user before engaging autonomous control, the control system 100 may be configured to warn the user before and/or when returning to manual control mode (or another previous mode). This may be provided as a visual indication on the multi-functional display devices 62 ("MANUAL CONTROL MODE"), an audible ("DISENGAGING AUTONOMOUS CONTROL"), or other mechanisms described above. In certain embodiments, an icon or LED is provided to indicate when autonomous control is engaged, similar to a cruise control indicating when the feature is engaged in an automobile. A countdown may again be provided before the autonomous control is disabled, especially if a change in heading or velocity will be occurring.

As discussed above, the comparison of multiple items compared to corresponding thresholds may be taken together to determine the corresponding notification, display, and/or automatic modification of an operation of the marine vessel. For simplicity, combined thresholds are sometimes referred to herein as corresponding to risk level thresholds. However, risk levels may also be assigned to single items (e.g., a size of an object) being compared to one or more thresholds. By way of example, the size and location of a wave may be taken together to be determined as being beyond a threshold associated with "high" risk for both a wave at least 5 feet tall and within 100 feet and any wave at least 8 feet tall (regardless of distance). In contrast, the 5-foot-tall wave at 105 feet would not be beyond at least the combined threshold provided above, though there may be other thresholds provided. It should be recognized that the notification, display, and/or automatic modification of one or more operations may vary based on whether and which threshold is exceeded.

Figure 27:
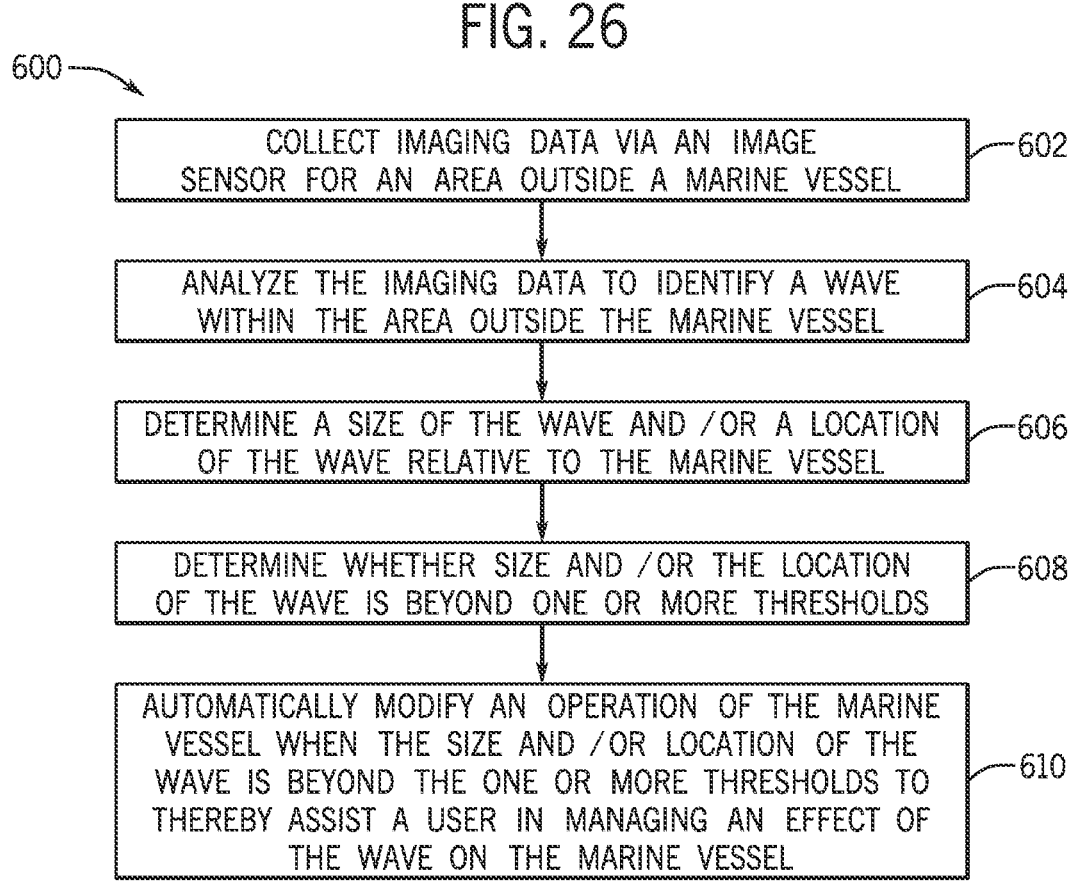
FIG. 27 is a flow chart depicting a method for detecting waves and automatically modifying an operation of a marine vessel to assist a user in managing an effect of a wave on the marine vessel according to the present disclosure.

FIG. 27 depicts another method 600 for assisting a user operating a marine vessel, in this case a marine vessel having an image sensor configured to collect imaging data for an area outside the marine vessel, which may be configured in a manner such as that described above. Step 602 provides for collecting imaging data via the image sensor for the area outside the marine vessel. The imaging data is analyzed in step 604 to identify a wave within the area outside the marine vessel. Step 606 provides for determining a size of the wave and/or a location of the wave relative to the marine vessel. Step 608 provides for determining whether the size and/or the location of the wave is beyond one or more thresholds, respectively. As mentioned, each of these steps may be performed using the components and methods described above. Step 610 provides for automatically modifying an operation of the marine vessel when the size and/or location of the wave is beyond the one or more thresholds to thereby assist the user in managing an effect of the wave on the marine vessel. As discussed above, this operation may correspond to changing a speed of the marine vessel via controlling the speed of the powerhead), a heading of the marine vessel via controlling the steering actuator, a pitch and/or roll of the marine vessel via controlling the trim actuators for marine drives, and/or the pitch and/or the roll of the marine vessel via controlling the trim actuators for trim tables.

The automatic modification of the operation may also be based on other factors, in addition to or instead of the size and/or location of the wave or other objects. By way of example, these include the distance between the object and the marine vessel, the direction of travel of the marine vessel and/or the object (including an angle of the object's direction of movement relative to the marine vessel), readings from other sensors such as the IMU/AHRS 52 (FIG. 1) the velocity of the marine vessel and/or the object, the type of the object, and other attributes of the object discussed above. In certain examples, the user may also select how aggressively the system will apply the automatic modification of operations of the marine vessel. This may include how quickly the marine vessel will resolve a given risk (e.g., the rate at which the steering angle will be modified), the predetermined time before action will be taken, and the like.

Figure 28:
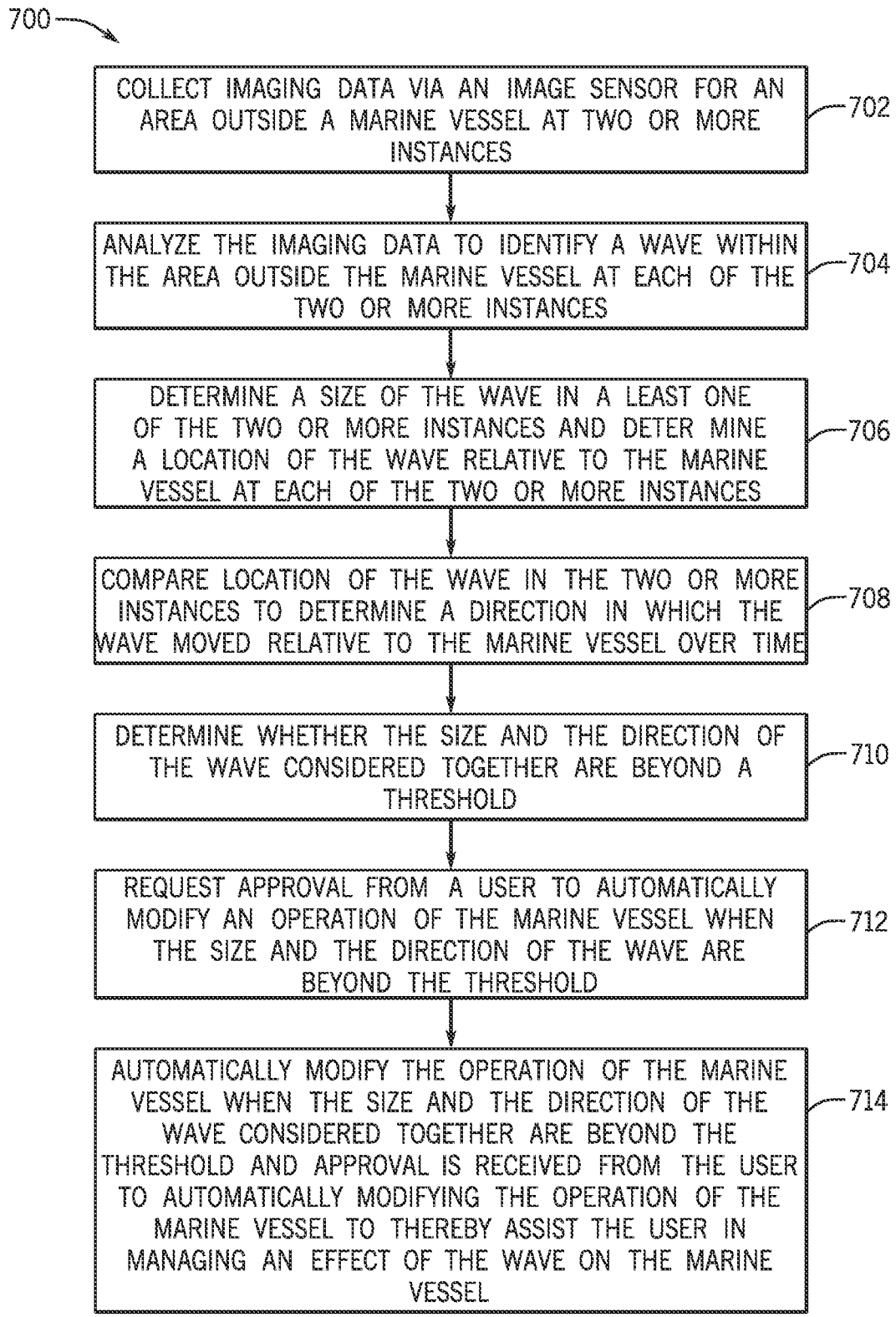
FIG. 28 is a flow chart depicting another method for detecting waves and automatically modifying an operation of a marine vessel to assist a user in managing an effect of a wave on the marine vessel according to the present disclosure.

FIG. 28 depicts another method 700 for assisting a user operating a marine vessel, in this case a marine vessel having an image sensor configured to collect imaging data for an area outside the marine vessel, which may be configured in a manner such as that described above. Step 702 provides for collecting imaging data via the image sensor for the area outside the marine vessel at two or more instances. The imaging data is analyzed in step 704 to identify a wave within the area outside the marine vessel at each of the two or more instances. Step 706 provides for determining a size of the wave in at least one of the two or more instances and determining a location of the wave relative to the marine vessel at each of the two or more instances.

The location of the wave in the two or more instances is compared in step 708 to determine a direction in which the wave moved relative to the marine vessel over time. Step 710 provides for determining whether the size and the direction of the wave considered together are beyond a threshold. In the method 700, user approval is required before autonomous control is initiated in response to the wave. In particular, step 712 provides for requesting approval from the user to automatically modifying an operation of the marine vessel when the size and the direction of the wave are beyond the threshold. This request may be provided via the multi-functional display device 62 at the helm 60 (FIG. 1), for example as a prompt that the user accepts by touching the screen. Step 714 provides for automatically modifying the operation of the marine vessel when the size and the direction of the wave considered together are beyond the threshold and approval is received from the user to automatically modifying the operation of the marine vessel to thereby assist the user in managing an effect of the wave on the marine vessel.

In this manner, the systems 10 and methods described herein provide new mechanisms for displaying information to the operator, which improve the safety, efficiency, and enjoyment of spending time on the water. It should be noted that the effectiveness in communicating this information may be more effective in gaining the operator's attention, and/or serve the additional benefit of provide better guidance for how the operator may optimally act in a given situation.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method for assisting a user operating a marine vessel, the marine vessel comprising an image sensor configured to collect imaging data for an area outside the marine vessel, the method comprising:
    collecting imaging data via the image sensor for the area outside the marine vessel;
    analyzing by a processor the imaging data to identify a wave within the area outside the marine vessel;
    determining by the processor a size of the wave and/or a location of the wave relative to the marine vessel;
    determining by the processor whether the size and/or the location of the wave is beyond one or more thresholds; and
    automatically modifying an operation of the marine vessel when the size and/or location of the wave is beyond the one or more thresholds to thereby assist the user in managing an effect of the wave on the marine vessel.

2. The method according to claim 1, further comprising waiting a predetermined time before automatically modifying the operation of the marine vessel.

3. The method according to claim 2, further comprising displaying a countdown of the predetermined time before automatically modifying the operation of the marine vessel.

4. The method according to claim 1, further comprising monitoring the size and/or the location over time and discontinuing automatically modifying the operation of the marine vessel when the size and/or the location is no longer beyond the one or more thresholds.

5. The method according to claim 1, wherein automatically modifying the operation of the marine vessel includes changing the operation from a first setting to a second setting, further comprising monitoring the size and/or the location and returning the operation of the marine vessel to the first setting when the size and/or the location is no longer beyond the one or more thresholds.

6. The method according to claim 5, wherein the first setting and the second setting correspond to a steering angle, a trim angle, and/or a powerhead speed for the marine vessel.

7. The method according to claim 1, wherein automatically modifying the operation of the marine vessel includes changing a speed of the marine vessel and/or a heading of the marine vessel.

8. The method according to claim 1, wherein a pitch and/or a roll of the marine vessel is adjustable by controlling a trim actuator, and wherein automatically modifying the operation of the marine vessel includes controlling the trim actuator to change the pitch and/or the roll of the marine vessel.

9. The method according to claim 1, wherein the image sensor comprises a stereo vision system having at least two individual image sensors with overlapping fields of view for collecting the imaging data for the area outside the marine vessel, and wherein the size of the wave is determined by analyzing the imaging data from each of the at least two individual image sensors.

10. The method according to claim 1, wherein the imaging data is collected via the image sensor for the area outside the marine vessel at two or more instances, and wherein the imaging data is analyzed to identify the wave within the area outside the marine vessel at each of the two or more instances, further comprising determining a direction in which the wave moved between the two or more instances, and further comprising automatically modifying the operation of the marine vessel based also on the direction in which the wave moved between the two or more instances.

11. The method according to claim 1, further comprising determining a distance between the wave and the marine vessel and automatically modifying the operation of the marine vessel based also on the distance between the wave and the marine vessel.

12. The method according to claim 1, further comprising measuring a velocity of the marine vessel and automatically modifying the operation of the marine vessel based also on the velocity of the marine vessel.

13. The method according to claim 1, wherein the one or more thresholds comprises a plurality of thresholds, further comprising varying the automatic modification of the operation of the marine vessel based on which of the plurality of threshold the size and/or the location of the wave is beyond.

14. The method according to claim 1, wherein the one or more thresholds are based at least in part on at least one of a hull type and a hull dimension.

15. A method for assisting a user operating a marine vessel, the marine vessel comprising an image sensor configured to collect imaging data for an area outside the marine vessel, the method comprising:
collecting imaging data via the image sensor for the area outside the marine vessel at two or more instances;
analyzing by a processor the imaging data to identify a wave within the area outside the marine vessel at each of the two or more instances;
determining by the processor a size of the wave in at least one of the two or more instances and determining a location of the wave relative to the marine vessel at each of the two or more instances;
comparing by the processor the location of the wave in the two or more instances to determine a direction in which the wave moved relative to the marine vessel over time;
determining by the processor whether the size and the direction of the wave considered together are beyond a threshold;
requesting approval from the user to automatically modify an operation of the marine vessel when the size and the direction of the wave are beyond the threshold; and
automatically modifying the operation of the marine vessel when the size and the direction of the wave considered together are beyond the threshold and approval is received from the user to automatically modify the operation of the marine vessel to thereby assist the user in managing an effect of the wave on the marine vessel.

16. The method according to claim 15, further comprising determining a velocity of the wave, wherein automatically modifying the operation of the marine vessel is based also on the velocity of the marine vessel.

17. The method according to claim 15, further comprising determining the direction of the wave as an angle relative to the marine vessel, wherein the threshold corresponds to the size of the wave being at least 4 feet tall and the direction of the wave relative to the marine vessel being at least 45 degrees.

18. The method according to claim 15, wherein the marine vessel is steerable by controlling a steering actuator, and wherein automatically modifying the operation of the marine vessel comprises controlling the steering actuator to steer the marine vessel so that the direction of the wave relative to the marine vessel is less than 45 degrees.

19. A system configured to assist a user in operating a marine vessel, the system comprising:
a marine drive operable to propel the marine vessel in water;
a steering actuator operable to steer the marine vessel;
an image sensor configured to collect imaging data for an area outside the marine vessel; and
a control system configured to:
analyze the imaging data to identify a wave within the area outside the marine vessel;
determine a size of the wave and/or a location of the wave relative to the marine vessel;
determine whether the size and/or the location of the wave is beyond a threshold; and
automatically modify operation of at least one of the marine drive and the steering actuator when the size and/or the location of the wave is beyond the threshold to thereby assist the user in managing an effect of the wave on the marine vessel.

20. The marine vessel according to claim 19, wherein the image sensor is configured to collect the imaging data at two or more instances, wherein the control system is further configured to determine the location of the wave at each of the two or more instances and to compare the location of the wave at each the two or more instances to determine a direction in which the wave moved relative to the marine vessel over time, and wherein the control system is further configured to automatically modify the operation of the marine vessel based also on the direction in which the wave moved between the two or more instances.

* * * * *